US012388792B2

(12) United States Patent
Shao

(10) Patent No.: US 12,388,792 B2
(45) Date of Patent: Aug. 12, 2025

(54) SECURE COMMUNICATION METHOD, RELATED APPARATUS, AND SYSTEM

(71) Applicant: Huawei Technologies Co., Ltd., Shenzhen (CN)

(72) Inventor: Guoqiang Shao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 18/064,501

(22) Filed: Dec. 12, 2022

(65) Prior Publication Data

US 2023/0156468 A1 May 18, 2023

Related U.S. Application Data

(63) Continuation of application No. PCT/CN2021/099508, filed on Jun. 10, 2021.

(30) Foreign Application Priority Data

Jun. 12, 2020 (CN) .......................... 202010537382.7

(51) Int. Cl.
*H04L 9/40* (2022.01)
*H04W 12/02* (2009.01)
*H04W 12/069* (2021.01)

(52) U.S. Cl.
CPC ...... *H04L 63/0281* (2013.01); *H04L 63/0435* (2013.01); *H04L 63/166* (2013.01); *H04W 12/069* (2021.01)

(58) Field of Classification Search
CPC ............. H04L 63/0281; H04L 63/0435; H04L 63/166; H04L 63/205; H04W 12/069
See application file for complete search history.

(56) References Cited

U.S. PATENT DOCUMENTS

| 11,038,923 B2* | 6/2021 | Bykampadi | ............. H04L 67/30 |
| 2016/0044507 A1* | 2/2016 | Agiwal | ................. H04W 12/02 |
| | | | 370/328 |

(Continued)

FOREIGN PATENT DOCUMENTS

WO  WO-2019220010 A1 * 11/2019 ............. H04L 61/15

OTHER PUBLICATIONS

3GPP TS 33.501 V15.8.0, Mar. 2020, 3rd Generation Partnership Project; Technical Specification Group Services and System Aspects; Security architecture and procedures for 5G system (Release 15), 191 pages.

(Continued)

*Primary Examiner* — Alison Slater
*Assistant Examiner* — Asghar H Bilgrami
(74) *Attorney, Agent, or Firm* — Conley Rose, P.C.

(57) ABSTRACT

A secure communication method includes a security edge protection proxy (SEPP) device at a transmitting end that obtains a message modification policy of an Internet Protocol (IP) exchange service (IPX) device interconnected with the SEPP device, and then sends a first N32 message to the IPX device, where the first N32 message carries a first signaling message and the message modification policy. The IPX device sends the received first N32 message to a SEPP device at a receiving end, and the SEPP device at the receiving end checks the first N32 message according to the message modification policy carried in the first N32 message.

15 Claims, 16 Drawing Sheets

(56) References Cited

U.S. PATENT DOCUMENTS

2019/0260803 A1\* 8/2019 Bykampadi ........... H04L 63/168
2021/0243165 A1\* 8/2021 Bykampadi ............ H04L 63/20

OTHER PUBLICATIONS

3GPP TS 33.501 V16.2.0, Mar. 2020, 3rd Generation Partnership Project; Technical Specification Group Services and System Aspects; Security architecture and procedures for 5G system(Release 16), 227 pages.

3GPP TS 29.573 V16.2.0, 3rd Generation Partnership Project, Technical Specification Group Core Network and Terminals 5G System; Public Land Mobile Network (PLMN) Interconnection; Stage 3 (Release 16), Mobile Competence Centre, Mar. 30, 2020, XP05186125, 86 pages.

\* cited by examiner

SECURE COMMUNICATION METHOD, RELATED APPARATUS, AND SYSTEM

CROSS-REFERENCE TO RELATED APPLICATIONS

This is a continuation of International Patent Application No. PCT/CN2021/099508 filed on Jun. 10, 2021, which claims priority to Chinese Patent Application No. 202010537382.7 filed on Jun. 12, 2020. The disclosures of the aforementioned applications are hereby incorporated by reference in their entireties.

TECHNICAL FIELD

This disclosure relates to the field of communications technologies, and in particular, to a secure communication method, a related communication apparatus, a system, and a related computer-readable storage medium.

BACKGROUND

The 3rd Generation Partnership Project (3GPP) defines a security edge protection proxy (SEPP) device as a border security gateway of a fifth generation (5G) core network (5GC). The SEPP device is a proxy device for interconnection between networks of different carriers. In signaling exchange between a network function (NF) device inside a 5G core network and a network of another carrier, signaling forwarding is performed by the SEPP device.

SEPP devices on different carrier networks may forward messages by using an Internet Protocol (IP) exchange service (IPX) network. The SEPP device supports an IPX device on the IPX network in modifying content of a transmission message. The IPX device may modify the transmission message according to a predefined message modification policy, so as to hide a network topology from the outside and enhance network security.

However, in a conventional technology, a SEPP device in a local network needs to negotiate with SEPP devices in networks of different carriers (roaming partners) about modification policies for messages that pass through different IPX networks. If the local network is interconnected to a large quantity of roaming partner networks, and there are a large quantity of optional paths between the SEPP device in the local network and the SEPP devices in roaming partner networks, that is, the SEPP device in the local network and the SEPP devices in the roaming partner networks may transmit messages through different IPX devices, the SEPP devices need to maintain a large quantity of message modification policies, a large quantity of resources of the SEPP devices need to be consumed, and costs of the SEPP devices are increased.

SUMMARY

Embodiments of this disclosure provide a secure communication method, system, and a related apparatus, and a computer-readable storage medium.

According to a first aspect, an embodiment of this disclosure provides a secure communication method, including the following operations.

A SEPP device receives a first signaling message sent by an NF device. Then, the SEPP device obtains a message modification policy of an IPX device, and sends a first N32 message to the IPX device, where the first N32 message carries the first signaling message and the message modification policy.

In the technical solution provided in this embodiment, a SEPP device at a transmitting end may obtain a message modification policy of an IPX device interconnected with the SEPP device at a transmitting end, and then sends a first N32 message to the IPX device, where the first N32 message carries a first signaling message and the message modification policy. In this way, the IPX device may send the received first N32 message to a SEPP device at a receiving end, and the SEPP device at the receiving end may check the first N32 message according to the message modification policy carried in the first N32 message. In comparison with a conventional technology, in the secure communication method provided in this embodiment, the SEPP device at the transmitting end does not need to negotiate the message modification policy with the SEPP device at the receiving end, but negotiates the modification policy with the IPX device interconnected with the SEPP device at the transmitting end, and then sends the message modification policy of the IPX device to the SEPP device at the receiving end through the first N32 message. This significantly reduces a quantity of message modification policies maintained on the SEPP device at the transmitting end, saves resources of the SEPP device, and reduces costs of the SEPP device.

Correspondingly, the SEPP device at the receiving end may obtain, from the received N32 message, the message modification policy of the IPX device interconnected with the SEPP device at the receiving end, and does not need to locally maintain message modification policies corresponding to different message transmission paths, so that resources of the SEPP device at the receiving end are saved and costs are also reduced.

In a possible solution, the SEPP device may obtain a security certificate of the IPX device, and add the security certificate to a message body of the first N32 message. Further, the SEPP device at the receiving end directly obtains the security certificate of the IPX device from the first N32 message, and does not need to locally configure the security certificate of the IPX device, so that storage space of the SEPP device at the receiving end is saved.

In a possible solution, the SEPP device may encrypt the security certificate of the IPX device by using a symmetric key. In a possible solution, the SEPP device that receives the N32 message may use the symmetric key to decrypt and obtain the security certificate of the IPX device.

In a possible solution, the SEPP device obtains the security certificate of the IPX device. The first N32 message sent by the SEPP device carries the security certificate of the IPX device.

In a possible solution, the message modification policy includes that a first field in a message header of the first N32 message can be modified.

In a possible solution, the message modification policy includes that a second field in the message header of the first N32 message cannot be modified.

In a possible solution, the SEPP device may send the first N32 message to the IPX device in the following manner. The SEPP device encapsulates the first signaling message and the message modification policy of the IPX device in the message body of the first N32 message, and sends the first signaling message and the message modification policy of the IPX device to the IPX device. The message modification policy may be carried in an existing field, or may be carried in a newly added field.

In a possible solution, the SEPP device may carry the message modification policy in a clear text part of the message body of the first N32 message, and send the message modification policy to the IPX device. The SEPP device may perform integrity protection on the clear text part to prevent other devices from modifying the clear text part, to enhance security.

In a possible solution, the SEPP device may encrypt the message modification policy by using a symmetric key, and then carry a ciphertext in the message body of the first N32 message and send the ciphertext to the IPX device, to prevent other devices from reading or modifying the message modification policy, to enhance security. In a possible solution, the SEPP device that receives the first N32 message may use the symmetric key to decrypt and obtain the message modification policy of the IPX device.

In a possible solution, the SEPP device may obtain the message modification policy of the IPX device from a local configuration, and then add the modification policy of the IPX device to the first N32 message.

In a possible solution, the SEPP device receives a second N32 message sent by the IPX device, where the second N32 message carries a second signaling message and modification content of the IPX device. The SEPP device may check the modification content in the second N32 message according to the message modification policy of the IPX device, and if the check succeeds, send the second signaling message to the NF device. If the check fails, the SEPP device may send a failure response to the IPX device, and discard the second N32 message.

According to a second aspect, an embodiment of this disclosure provides a secure communication method, and the method mainly includes a SEPP device that receives an N32 message, where the N32 message carries a signaling message and a message modification policy of an IPX device. Then, the SEPP device may check the N32 message according to the message modification policy of the IPX device. If the check succeeds, the SEPP device sends the signaling message in the N32 message to an NF device.

In the secure communication method provided in this aspect, the SEPP device that receives the N32 message may obtain the message modification policy of the IPX device from the N32 message, and check the N32 message by using the modification policy. The SEPP device does not need to locally configure the message modification policy of the IPX device, so that storage space is saved and costs are reduced.

In a possible solution, the SEPP device receives an N32 message sent by the second IPX device, where the N32 message is sent to the SEPP device via the first IPX device.

In a possible solution, if the SEPP device fails to check the N32 message, the SEPP device sends a failure response to the IPX device, and discards the N32 message.

In a possible solution, the N32 message received by the SEPP device further carries the security certificate of the IPX device. The SEPP device may check the N32 message in the following manner. The SEPP device checks a signature in a modification block of the IPX device in the N32 message based on a security certificate. If the check succeeds, the SEPP device checks modification content in the modification block according to the message modification policy. If the check fails, the SEPP device may send a failure response to the IPX device, and discard the N32 message.

In a possible solution, the modification block of the IPX device includes modification content of the IPX device.

In a possible solution, the modification block of the IPX device includes an identifier of the IPX device.

In a possible solution, the modification block of the IPX device includes a metadata field, where the metadata field includes the identifier of the IPX device.

In a possible solution, the SEPP device obtains the message modification policy of the IPX device from a message body of the N32 message.

In a possible solution, the SEPP device decrypts the message body of the N32 message, to obtain the message modification policy of the IPX device.

In a possible solution, the SEPP device decrypts the message body of the N32 message, obtains the signaling message carried in the N32 message, and then may send the signaling message to another network device.

In a possible solution, the N32 message further carries the modification content of the IPX device. The SEPP device may check the modification content of the IPX device according to the message modification policy of the IPX device.

According to a third aspect, an embodiment of this disclosure provides a secure communication method, and the method mainly includes a first SEPP device that receives an N32 message sent by a first IPX device, where the N32 message carries a signaling message. Then, the first SEPP device obtains a message modification policy of the first IPX device, and checks the N32 message according to the message modification policy. If the check succeeds, the first SEPP device sends the signaling message to an NF device.

In the solution provided in this aspect, the first SEPP device may receive the N32 message of the first IPX device connected to the first SEPP device, and check the N32 message, so that message transmission security is improved.

In a possible solution, the first SEPP device locally obtains the message modification policy of the first IPX device. The message modification policy of the first IPX device may be configured on the SEPP device.

In a possible solution, the N32 message further carries modification content of the first IPX device. The first SEPP device may check the N32 message in the following manner. The first SEPP device checks the modification content of the first IPX device in the N32 message according to the message modification policy of the first IPX device.

In a possible solution, if the first SEPP device fails to check the N32 message, the SEPP device sends a failure response to the first IPX device, and discards the N32 message.

In a possible solution, the N32 message further carries a security certificate of a second IPX device, a message modification policy of the second IPX device and a modification block of the second IPX device. The second IPX device is connected to a second SEPP device.

In this case, the first SEPP device checks the modification block of the second IPX device by using the security certificate. If the check succeeds, the first SEPP device checks modification content in the modification block of the second IPX device according to the message modification policy of the second IPX device.

In this solution, the first SEPP device checks the N32 message twice, to be specific, checks the modification block of the second IPX device by using the security certificate and checks the modification content of the second IPX device according to the message modification policy of the second IPX device, so that security is further enhanced.

In a possible solution, the security certificate of the second IPX device includes a public key of the second IPX device.

In a possible solution, the first SEPP device receives a notification message sent by the second SEPP device, where the notification message carries the message modification policy of the second IPX device. In this case, the N32 message received by the first SEPP device carries the modification content of the second IPX device, and does not need to carry the message modification policy of the second IPX device.

In this case, the first SEPP device checks the modification content of the second IPX device in the N32 message according to the message modification policy in the notification message.

In a possible solution, the second SEPP device receives a notification message sent by the first SEPP device, where the notification message carries the message modification policy of the first IPX device. In the solution provided in this aspect, when the second SEPP device subsequently receives the N32 message sent by the first SEPP device, the second SEPP device may check the N32 message according to the message modification policy of the first IPX device in the notification message, so that message transmission security is improved.

In a possible solution, the notification message is used to exchange information about IPX devices between the first SEPP device and the second SEPP device.

In a possible solution, the notification message is an N32-C message. In this solution, the message modification policy of the IPX device is transferred by using the N32-C message, so that security of communication between the first SEPP device and the second SEPP device is enhanced.

In a possible solution, when the message modification policy of the second IPX device is carried in the notification message received by the first SEPP device, the first SEPP device saves an identifier of the second IPX device and the message modification policy of the second IPX device. The saving may be understood as establishing an association between the identifier of the second IPX device and the message modification policy of the second IPX device.

According to a fourth aspect, an embodiment of this disclosure provides a computer-readable storage medium. The computer-readable storage medium stores a computer program. When the computer program is executed by a processor, the method according to any one of the first aspect, the second aspect, the third aspect, or the fourth aspect can be implemented.

According to a fifth aspect, an embodiment provides a security and edge protection proxy SEPP device, including at least one processor and a memory coupled to each other. The memory stores computer program code, and the processor invokes and executes the computer program code in the memory, to enable the SEPP device to perform the method according to any one of the first aspect, the second aspect, the third aspect, or the fourth aspect.

According to a sixth aspect, an embodiment of this disclosure provides a secure communication system, including a core network function device and a SEPP device, where the core network function device is configured to send a first signaling message to a first SEPP device, and the SEPP device is configured to perform the method according to any one of the implementations of the first aspect.

In a possible solution, the signaling message is a roaming signaling message.

According to a seventh aspect, an embodiment of this disclosure provides a SEPP device. The device may be used in the secure communication method provided in the first aspect.

The SEPP device provided in this aspect mainly includes a first receiving unit, a first obtaining unit, and a first sending unit.

The first receiving unit is configured to receive a first signaling message sent by an NF device.

The first obtaining unit is configured to obtain a message modification policy of an IP exchange service IPX device.

The first sending unit is configured to send a first N32 message to the IPX device, where the first N32 message carries the first signaling message and the message modification policy of the IPX device.

In a possible solution, the first obtaining unit in the SEPP device may be further configured to obtain a security certificate of the IPX device. In this case, the first N32 message sent by the first sending unit carries the security certificate of the IPX device.

In a possible solution, the first sending unit of the SEPP device may send the first N32 message in the following manner. The first sending unit encapsulates the first signaling message and the message modification policy of the IPX device in a message body of the first N32 message, and sends the first signaling message and the message modification policy of the IPX device to the IPX device.

In a possible solution, the message modification policy of the IPX device may be carried in a clear text part of a message body of the first N32 message.

In a possible solution, the first obtaining unit may obtain the message modification policy of the IPX device from a local configuration.

In a possible solution, the first receiving unit of the SEPP device is further configured to receive a second N32 message sent by the IPX device, where the second N32 message carries a second signaling message and modification content of the IPX device.

The SEPP device further includes a first check unit configured to check the modification content of the IPX device in the second N32 message according to the message modification policy of the IPX device.

The first sending unit further sends the second signaling message to the NF device after the check performed by the first check unit succeeds.

According to an eighth aspect, an embodiment of this disclosure provides a SEPP device. The SEPP device may be used in the secure communication method provided in the second aspect. The SEPP device mainly includes a second receiving unit, a second check unit, and a second sending unit.

The second receiving unit is configured to receive an N32 message, where the N32 message carries a signaling message and a message modification policy of an IPX device. The second check unit is configured to check the N32 message according to the message modification policy of the IPX device. The second sending unit is configured to send the signaling message to an NF device after the check performed on the N32 message by the second check unit succeeds.

In a possible solution, the N32 message received by the second receiving unit in the SEPP device further carries a security certificate of the IPX device. That the second check unit checks the N32 message according to the message modification policy includes the second check unit that checks a signature in a modification block of the IPX device in the N32 message based on the security certificate of the IPX device. After the check succeeds, the second check unit further checks modification content in the modification block of the IPX device according to the message modification policy.

In a possible solution, the SEPP device further includes a decryption unit configured to decrypt a message body of the N32 message, to obtain the message modification policy of the IPX device.

In a possible solution, the decryption unit of the SEPP device is further configured to decrypt the message body of the N32 message, to obtain the signaling message carried in the N32 message.

According to a ninth aspect, an embodiment of this disclosure provides a first SEPP device. The device may be used in the secure communication method provided in the third aspect. For specific details and beneficial effects, refer to the content in the foregoing aspects.

The first SEPP device provided in this aspect mainly includes a third receiving unit, a third obtaining unit, a third check unit, and a third sending unit.

The third receiving unit is configured to receive an N32 message sent by a first IPX device, where the N32 message carries a signaling message.

The third obtaining unit is configured to obtain a message modification policy of the first IPX device.

The third check unit is configured to check the N32 message according to the message modification policy.

The third sending unit is configured to send the signaling message to the NF device after the check on the N32 message performed by the third check unit succeeds.

In a possible solution, the N32 message received by the third receiving unit further carries modification content of the first IPX device. The third check unit may check the N32 message in the following manner. The third check unit checks the modification content of the first IPX device in the N32 message according to the message modification policy.

In a possible solution, the N32 message received by the third receiving unit further carries a security certificate of a second IPX device, a message modification policy of the second IPX device and a modification block of the second IPX device. In this case, the third check unit is further configured to check the modification block of the second IPX device by using the security certificate. When the check succeeds, the third check unit checks modification content in the modification block of the second IPX device according to the message modification policy of the second IPX device.

In a possible solution, the third receiving unit of the first SEPP device is further configured to receive a notification message sent by the second SEPP device, where the notification message carries the message modification policy of the second IPX device.

In a possible solution, the first SEPP device is a cSEPP device, and the second SEPP device is a pSEPP device.

According to a tenth aspect, an embodiment of this disclosure provides a communication apparatus, including at least one input end, a signal processor, and at least one output end. The signal processor is configured to perform some or all operations of any method performed by a SEPP device in embodiments of this disclosure.

According to an eleventh aspect, an embodiment of this disclosure provides a communication apparatus, including an input interface circuit, a logic circuit, and an output interface circuit. The logic circuit is configured to perform some or all operations of any method performed by a SEPP device in embodiments of this disclosure.

According to a twelfth aspect, an embodiment of this disclosure provides a computer program product including instructions. When the computer program product is run on a computer device, the computer device is enabled to perform some or all operations of any method that may be performed by a SEPP device.

According to a thirteenth aspect, an embodiment of this disclosure provides a SEPP device, including a memory and a processor that are coupled to each other. The memory stores program code, and the processor invokes and executes the program code in the memory, to enable the SEPP device to perform some or all operations of the foregoing communication method.

According to a fourteenth aspect, an embodiment of this disclosure provides a communication apparatus, including at least one input end, a signal processor, and at least one output end. The signal processor is configured to perform some or all operations of any method performed by an IPX device in embodiments of this disclosure.

According to a fifteenth aspect, an embodiment of this disclosure provides a communication apparatus, including an input interface circuit, a logic circuit, and an output interface circuit. The logic circuit is configured to perform some or all operations of any method performed by an IPX device in embodiments of this disclosure.

According to a sixteenth aspect, an embodiment of this disclosure provides a computer program product including instructions. When the computer program product is run on a computer device, the computer device is enabled to perform some or all operations of any method that may be performed by an IPX device.

According to a seventeenth aspect, an embodiment of this disclosure provides an IPX device, including a memory and a processor that are coupled to each other. The memory stores program code, and the processor invokes and executes the program code in the memory, to enable the IPX device to perform some or all operations of the foregoing communication method.

In a solution provided in any one of the foregoing aspects, an N32 message is an N32-f message.

In a solution provided in any one of the foregoing aspects, a SEPP device is a consumer's SEPP device or a producer's SEPP device.

In a solution provided in any one of the foregoing aspects, a SEPP device is a visit SEPP device or a home SEPP device.

In a solution provided in any one of the foregoing aspects, a message modification policy may be a default policy or a wildcard policy, so that a quantity of policies configured on a SEPP device or an IPX device is reduced.

BRIEF DESCRIPTION OF DRAWINGS

The following briefly describes accompanying drawings that need to be used in embodiments of this disclosure.

DESCRIPTION OF EMBODIMENTS

The following describes the technical solutions in embodiments of this disclosure with reference to the accompanying drawings in embodiments of this disclosure.

In the specification, claims, and accompanying drawings of this disclosure, the terms "first", "second", and so on are intended to distinguish between different objects but do not indicate a particular order.

Figure 1A:
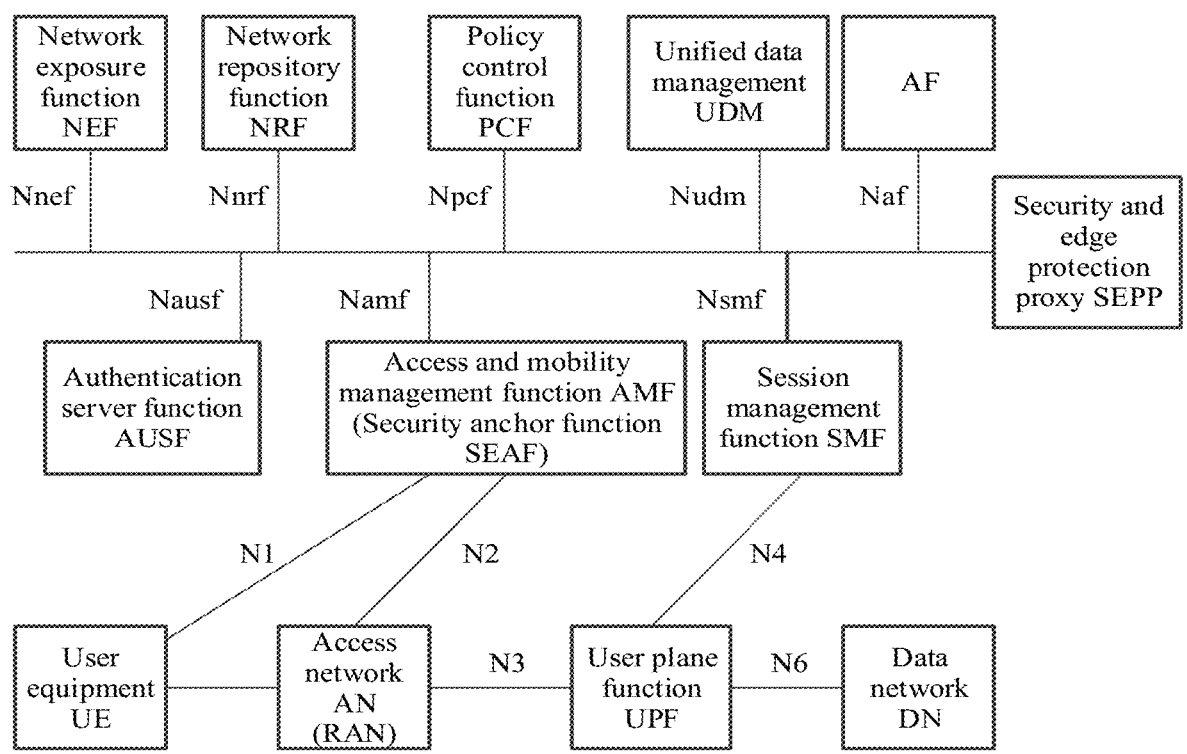
FIG. 1A is a schematic diagram of an example of a 5G network architecture according to an embodiment of this disclosure.

FIG. 1A is a schematic diagram of an example of a 5G network architecture according to an embodiment of this disclosure. In a 5G network, some function devices (for example, a mobility management entity (MME)) in a fourth generation (4G) network are split, and a service-based architecture is defined. In the network architecture shown in FIG. 1A, a function similar to that of an MME in a 4G network is split into an access and mobility management function (AMF), a session management function (SMF), and the like.

The following describes some other related devices/network elements/entities in the 5G network architecture. These devices/network elements/entities may be referred to as their respective abbreviations, for example, an access and mobility management function device is referred to as an AMF.

User equipment (UE) accesses a data network by accessing a carrier network, and uses a service provided by a carrier or a third party on the data network (DN).

For ease of description, in embodiments of this disclosure, a user terminal, the user equipment, a terminal device, or a mobile terminal may be collectively referred to as UE. That is, unless otherwise specified, the UE described hereinafter in embodiments of this disclosure may be replaced with the user terminal, the user equipment, the terminal device, the mobile terminal, or the terminal. Certainly, the user terminal, the user equipment, the terminal device, the mobile terminal, or the terminal can also be interchanged.

The AMF is a control-plane function device in a 3GPP network, and is mainly responsible for access control and mobility management when the UE accesses the carrier network. The security anchor function (SEAF) may be deployed in the AMF, or the SEAF may be deployed in another device other than the AMF. In FIG. 1A, an example in which the SEAF is deployed in the AMF is used. When the SEAF is deployed in the AMF, the SEAF and the AMF may be jointly referred to as an AMF.

The SMF is a control-plane function device in the 3GPP network. The SMF is mainly configured to manage a packet data unit (PDU) session of the UE. A PDU session is a channel used to transmit a PDU, and the UE and the DN may send a PDU to each other by using the PDU session. The SMF is responsible for management tasks such as establishment, maintenance, and deletion of the PDU session.

The data network is also referred to as a packet data network (PDN), and is a network outside the 3GPP network. A plurality of DNs may be connected to the 3GPP network, and a plurality of services provided by a carrier or a third party may be deployed in the DN, for example, an online video service provided by the third party. For another example, a DN is a private network of a smart factory, a sensor installed in a workshop of the smart factory plays a role of the UE, and a control server of the sensor is deployed in the DN. The UE communicates with the control server. After obtaining instructions from the control server, the UE may transfer collected data to the control server based on the instructions. For another example, a DN is an internal office network of a company, a terminal used by an employee of the company may play a role of the UE, and the UE may access internal information and other resources of the company.

A unified data management (UDM) entity is also a control-plane function device in the 3GPP network. The UDM is mainly responsible for storing subscription data, credentials, subscriber permanent identifiers (SUPIs), and the like of subscribers (UEs) in the 3GPP network. The data may be used for authentication and authorization when the UE accesses a 3GPP network of a carrier. In addition, the UDM may further integrate functions of a home subscriber server (HSS) and a home location register (HLR) in a network.

An authentication server function (AUSF) is also a control-plane function device in the 3GPP network. The AUSF is mainly used for first-level authentication (that is, subscriber authentication in the 3GPP network).

A network exposure function (NEF) is also a control-plane function device in the 3GPP network. The NEF is mainly responsible for exposing external interfaces of the 3GPP network to third parties in a secure manner.

A network repository function (NRF) is also a control-plane function device in the 3GPP network. The NRF is mainly responsible for storing configuration service profiles of accessible network functions (NFs), and providing network function discovery services for other network elements.

A user plane function (UPF) is a gateway for communication between the 3GPP network and the DN.

A policy control function (PCF) is a control-plane function device in the 3GPP network, and is configured to provide a policy of a PDU session for the SMF. The policy may include a charging policy, a quality of service (QoS) policy, an authorization-related policy, or the like.

An access network (AN) is a sub-network of the 3GPP network. To access the 3GPP network, the UE needs to first access the AN. In a radio access scenario, the AN is also referred to as a radio access network (RAN).

As an edge security gateway of a 5GC, a SEPP device mainly serves as a proxy for interconnection between carrier networks. A signaling message between an internal NF of the 5G core network and a roaming network is forwarded by the SEPP.

The 3GPP network is a network that complies with 3GPP specifications. In FIG. 1A, parts other than the UE and the DN may be considered as the 3GPP network. The 3GPP network is not limited to a 5G network, and may further include a second generation (2G) network, a third generation (3G) network, and a 4G network. Usually, the 3GPP network is operated by a carrier. In addition, N1, N2, N3, N4, and N6 in the architecture shown in FIG. 1A represent reference points between related entities/network functions. Nausf, Namf, and the like represent service-oriented interfaces of related network functions.

Certainly, the 3GPP network and a non-3GPP network may coexist, and some network elements in the 5G network may also be used in some non-5G networks.

Figure 1B:
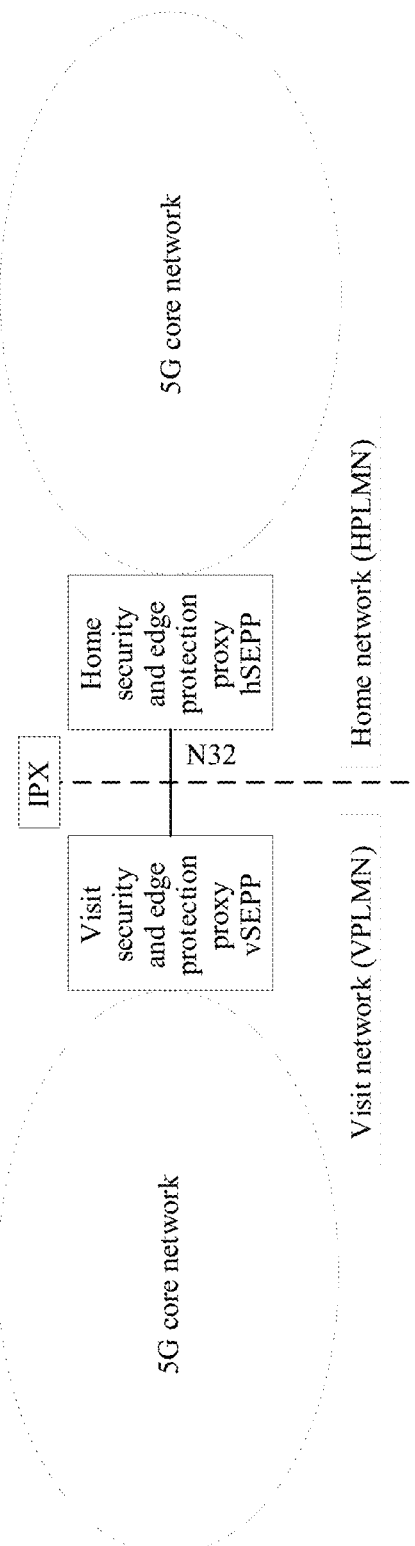
FIG. 1B is a schematic diagram of an example of a network architecture in a roaming scenario according to an embodiment of this disclosure.

Refer to FIG. 1B. As a border security gateway, a SEPP device not only supports integrity and confidentiality protection for a transmitted message, but also supports a device (IPX device or IPX) in an IPX network in identifying and modifying content of the transmitted message, for example, modifying a message header of the transmitted message.

Devices in the IPX network may include a diameter routing agent (DRA) device, a domain name server (DNS), and the like. The IPX device may be a DRA device or a DNS in the IPX network. In addition, the IPX device may be referred to as a Hypertext Transfer Protocol (HTTP) proxy.

In this embodiment of this disclosure, the SEPP device may also be referred to as a SEPP (where for example, the first SEPP device is referred to as a first SEPP, the second SEPP device is referred to as a second SEPP, and so on). In other words, the SEPP and the SEPP device can be interchanged. The IPX device is referred to as an IPX (for example, a first IPX device is referred to as a first IPX, a second IPX device is referred to as a second IPX, and so on). In order words, the IPX and the IPX device can be interchanged.

When the UE roams between different carrier networks, the SEPP device may be classified into a visit SEPP device (vSEPP device) and a home SEPP device (hSEPP device).

Figure 1C:
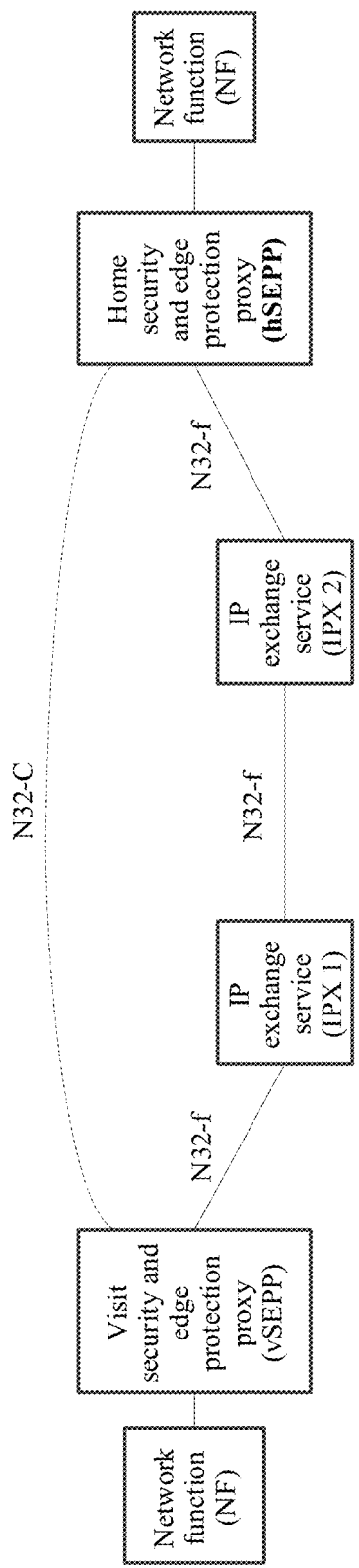
FIG. 1C is a schematic diagram of an example of a network architecture in another roaming scenario according to an embodiment of this disclosure.
Figure 1D:
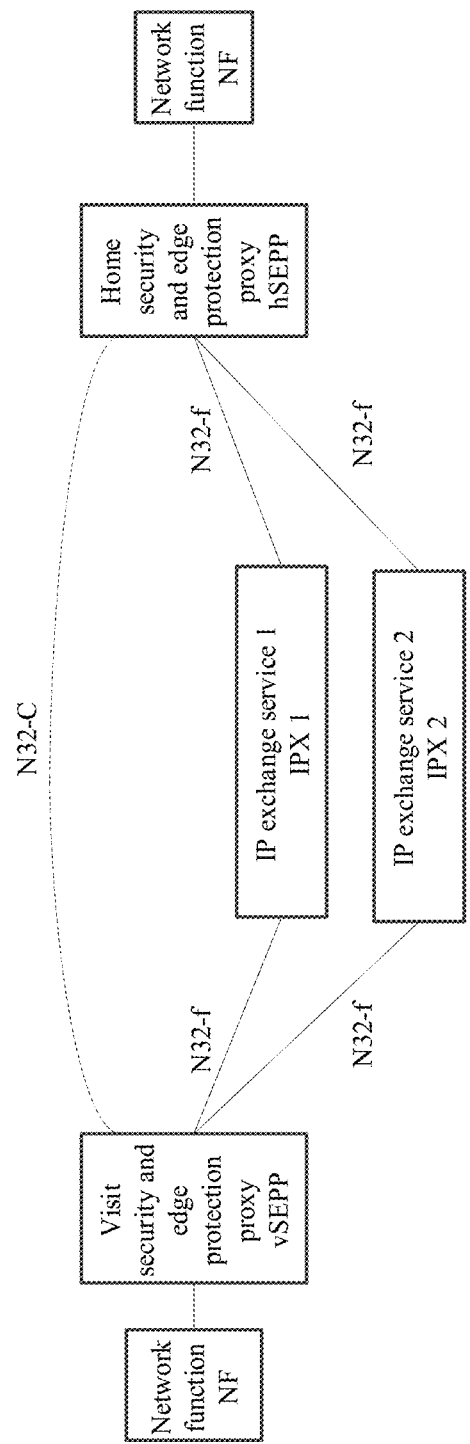
FIG. 1D is a schematic diagram of an example of a network architecture in another roaming scenario according to an embodiment of this disclosure.

Refer to FIG. 1C and FIG. 1D. SEPP devices in different carrier networks may be connected via N32 interfaces. For example, if a vSEPP device and an hSEPP device are directly connected via an N32-C interface, the vSEPP device may also be connected to an IPX device via an N32-f interface, and then the IPX device is connected to the hSEPP device via an N32-f interface. There may be one IPX device (for example, as shown in FIG. 1D) or a plurality of IPX devices (for example, as shown in FIG. 1C) between SEPP devices.

Figure 1E:
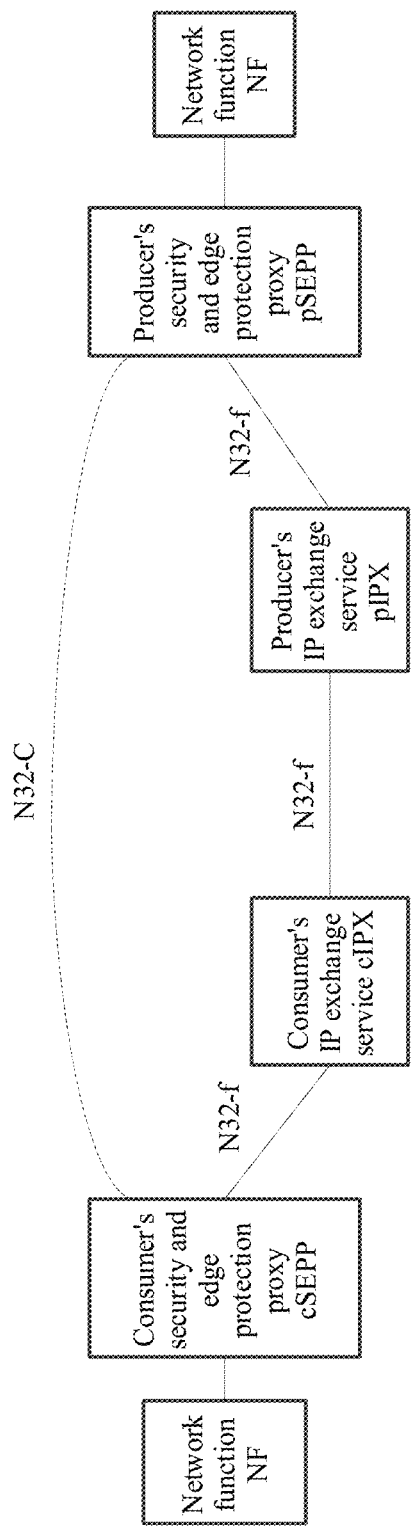
FIG. 1E is a schematic diagram of an example of a network architecture in another roaming scenario according to an embodiment of this disclosure.

Refer to FIG. 1E. From a perspective of providing a service and consuming the service, SEPP devices may be further classified into a consumer's SEPP device (cSEPP device) and a producer's SEPP device (pSEPP device). A vSEPP device may be a pSEPP device, and an hSEPP device may be a cSEPP device. Alternatively, a vSEPP device may be a cSEPP device, and an hSEPP device may be a pSEPP device.

When a plurality of IPX networks exist between SEPP devices, an IPX network directly connected to the pSEPP device is referred to as a pIPX device, and an IPX network directly connected to the cSEPP device is referred to as a cIPX device.

Figure 2A:
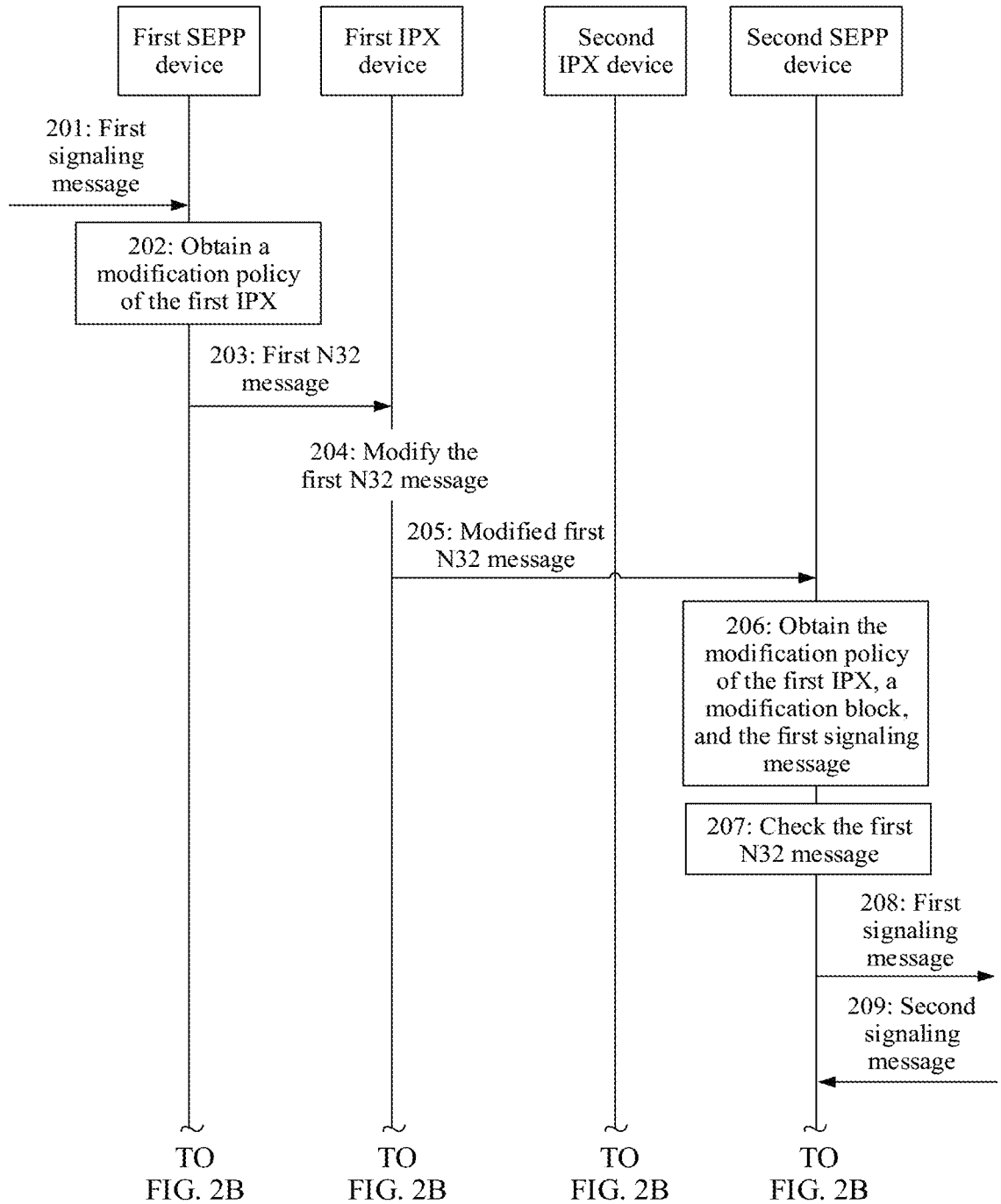
FIG. 2A and FIG. 2B are a schematic flowchart of a communication method according to an embodiment of this disclosure.
Figure 2B:
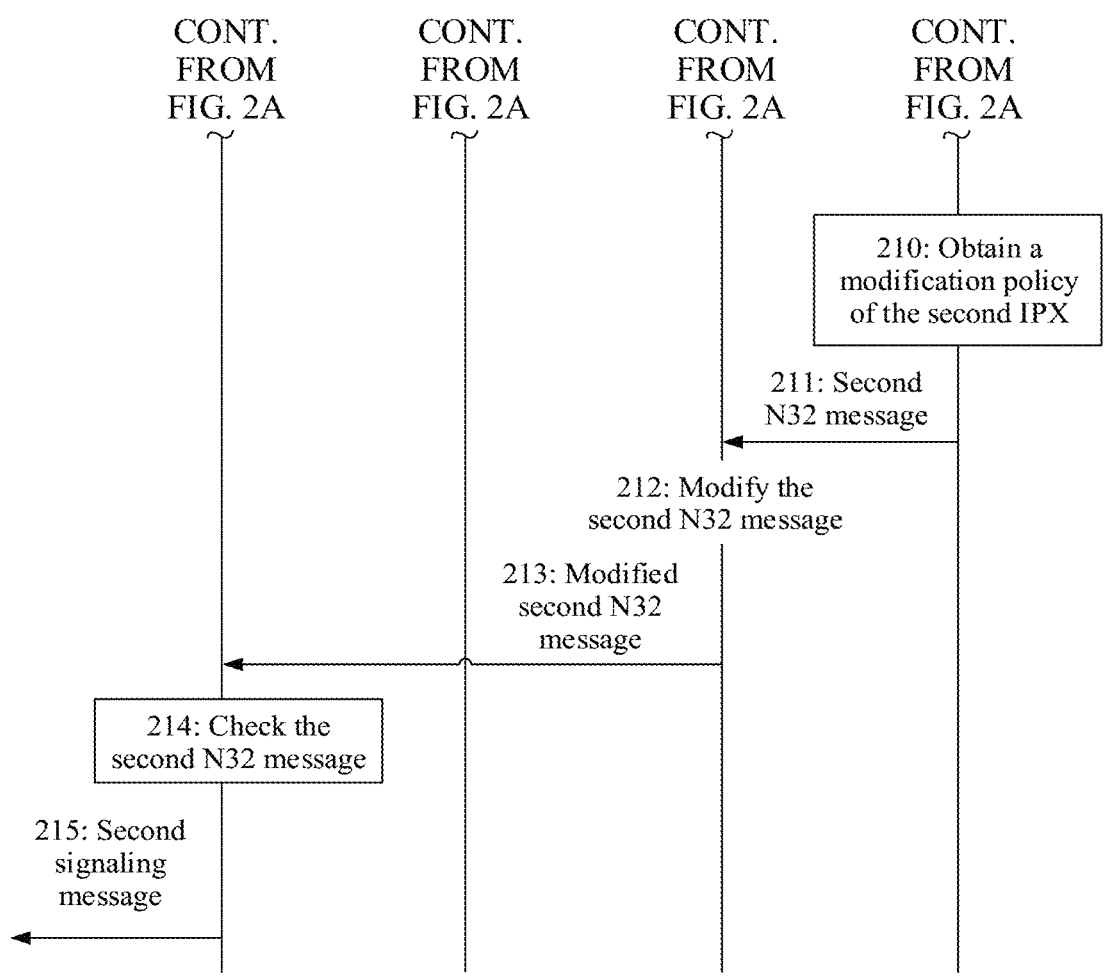

Based on the foregoing network architectures, the following describes an implementation solution for performing secure communication between two SEPP devices. FIG. 2A and FIG. 2B are a schematic flowchart of a secure communication method according to an embodiment of this disclosure.

The secure communication method provided in this embodiment may be applied to a system architecture described in FIG. 1D, and there may be a plurality of transmission paths between a first SEPP device and a second SEPP device.

The secure communication method provided in this embodiment mainly includes the following operations.

201: The first SEPP device receives a first signaling message sent by an NF device.

In this embodiment, the NF device in a local network sends the first signaling message to the first SEPP device, and the first SEPP device may send the signaling message to another carrier network, for example, a home carrier network of a user, via a connected IPX device.

The first signaling message may be an HTTP/2 message, and may be further an HTTP/2 request/response. The first signaling message may come from the SMF.

202: The first SEPP device obtains a message modification policy of a first IPX device.

In this embodiment, there may be a plurality of IPX devices connected to the first SEPP device, and these IPX devices belong to different IPX networks. The first SEPP device may determine the first IPX device on a transmission path of the first signaling message, and then obtain a message modification policy of the first IPX device.

In this embodiment, the first SEPP device and the first IPX device may negotiate the message modification policy in advance, and then the first SEPP device and the first IPX device locally configure the message modification policy.

In this embodiment, the foregoing message modification policy may be referred to as a message protection policy, or may be referred to as a modification policy or a protection policy.

203: The first SEPP device sends a first N32 message to the first IPX device, where the first N32 message carries the first signaling message and the message modification policy.

In this embodiment, the first SEPP device may generate the first N32 message based on the first signaling message and the message modification policy. The first N32 message carries the message modification policy of the first IPX device and the first signaling message.

Subsequently, the first SEPP device may perform security protection, for example, encryption, on the first N32 message. The first SEPP device may send, to the first IPX device, a first N32 message obtained by performing security protection.

The first N32 message in this embodiment may be a first N32-f message.

204: The first IPX device receives the first N32 message sent by the first SEPP device, and modifies the first N32 message.

In this embodiment, the IPX device may modify the first N32 message according to the locally configured message modification policy. Modification content is attached to the first N32 message in a form of a modification block, and is signed by using a private key of the first IPX device.

The IPX device may locally maintain a plurality of message modification policies, and these message modification policies are respectively for different SEPP devices. The IPX device may locally store a correspondence between an identifier of a SEPP device and a message modification policy. Further, after receiving the first N32 message sent by the first SEPP device, the IPX device determines a message modification policy corresponding to an identifier of the first SEPP device.

205: The first IPX device sends, to the second SEPP device, a modified first N32 message.

206: The second SEPP device obtains the message modification policy, a modification block, and the first signaling message in the modified first N32 message.

In this embodiment, after receiving the modified first N32 message sent by the first IPX device, the second SEPP device may obtain the message modification policy, the modification block, and the first signaling message that are carried in the modified first N32 message. For example, the second SEPP device decrypts the modified first N32 message to obtain the first signaling message.

207: The second SEPP device checks the modification block in the first N32 message according to the message modification policy of the first IPX device.

In this embodiment, the second SEPP device may further check whether the modification block meets the message modification policy, for example, whether a field that cannot be modified according to the message modification policy is modified by the first IPX device. If the modification block meets the message modification policy, the check succeeds. If the check fails, the SEPP device returns an error message to the first IPX device, and discards the first N32 message.

208: The second SEPP device sends the first signaling message to the NF device in the local network after the check succeeds.

The second SEPP device sends the first signaling message to the NF in the local network after the check on the modification block in the first N32 message succeeds. For example, the second SEPP device sends the first signaling message to an SMF or a UDM in a local core network, and the NF in the local network processes the first signaling message.

209: The second SEPP device receives a second signaling message sent by the NF in the local network.

In this embodiment, after processing the first signaling message, the NF in the local network may return the second signaling message to the second SEPP device, where the second signaling message may be transmitted back to the first SEPP device.

In addition, the second SEPP device may further receive a signaling message actively sent by another NF in the local network. To be distinguished from the first signaling message received by the second SEPP device from the first SEPP device, signaling messages that are sent by NFs in the local network and that are received by the second SEPP device are collectively referred to as second signaling messages.

210: The second SEPP device obtains a message modification policy of a second IPX device.

In this embodiment, the second signaling message may be sent to the first SEPP device by using the foregoing same IPX device (namely, the first IPX device), or may be sent to the first SEPP device via an IPX device (for example, the second IPX device) on another path. Processing logic of sending the second signaling message via the foregoing same IPX device and that of sending the second signaling message by using the IPX device on another path second signaling message are the same. This embodiment is described by using an example in which the second signaling message is sent to the first SEPP device via different IPX devices.

In this embodiment, the second SEPP device and the second IPX device may negotiate the message modification policy in advance, and then the first SEPP device and the first IPX device locally configure the message modification policy. When determining that the second signaling message needs to be sent via the second IPX device, the second SEPP device may obtain the message modification policy of the second IPX device from a local configuration.

211: The second SEPP device sends a second N32 message to the second IPX device, where the second N32 message carries the second signaling message and the message modification policy.

In this embodiment, the second SEPP device may generate the second N32 message based on the second signaling message and the message modification policy. The second N32 message carries the message modification policy of the second IPX device and the second signaling message.

Subsequently, the second SEPP device may encrypt the second N32 message, and send an encrypted second N32 message to the second IPX device. The second N32 message in this embodiment may be a second N32-f message.

212: The second IPX device receives the second N32 message sent by the second SEPP device, and modifies the second N32 message.

The second IPX device may modify the second N32 message according to the locally configured message modification policy. Modification content is attached to the second N32 message in a form of a modification block.

213: The second IPX device sends, to the first SEPP device, a modified second N32 message.

214: The first SEPP device obtains the message modification policy, a modification block, and the second signaling message in the modified second N32 message.

In this embodiment, after receiving the modified second N32 message sent by the second IPX device, the first SEPP device may obtain the message modification policy, the modification block, and the second signaling message that are carried in the modified second N32 message. For example, the first SEPP device may decrypt the modified second N32 message to obtain the second signaling message carried in the modified second N32 message.

214: The first SEPP device checks the modification block in the second N32 message according to the message modification policy of the second IPX device.

In this embodiment, the first SEPP device may further check whether the modification block meets the message modification policy, for example, whether a field that cannot be modified according to the message modification policy is modified by the second IPX device. If the modification block meets the message modification policy, the check succeeds. If the check fails, the SEPP device returns an error message to the second IPX device, and discards the second N32 message.

215: The first SEPP device sends the second signaling message to the NF device in the local network after the check succeeds.

The first SEPP device sends the second signaling message to the NF in the local network after the check on the modification block in the second N32 message succeeds. For example, the first SEPP device sends the second signaling message to an SMF or a PCF in a local core network, and the NF in the local network processes the second signaling message.

In the technical solution provided in this embodiment, the first SEPP device may serve as a SEPP device at a transmitting end to send the first N32 message, or may serve as a SEPP device at a receiving end to receive the second N32 message. Similarly, the second SEPP device may serve as a SEPP device at a transmitting end to send the second N32 message, or may serve as a SEPP device at a receiving end to receive the first N32 message.

Both the first SEPP device and the second SEPP device may obtain a message modification policy of an interconnected IPX device, and then send an N32 message to the IPX device. The N32 message carries the message modification policy of the IPX device. In this way, the IPX device may send the received N32 message to the second SEPP device or the first SEPP device. In comparison with a conventional technology, in the secure communication method provided in this embodiment, the SEPP device at the transmitting end does not need to negotiate the message modification policy with the SEPP device at the receiving end, but negotiates the modification policy with the IPX device interconnected with the SEPP device at the transmitting end, and then sends the negotiated message modification policy to the SEPP device at the receiving end through the N32 message. This significantly reduces a quantity of message modification policies maintained on the SEPP device at the transmitting end, saves resources of the SEPP device at the transmitting end, and reduces costs of the SEPP device at the transmitting end.

Correspondingly, the SEPP device at the receiving end may directly obtain, from the received N32 message, the message modification policy of the IPX device interconnected with the SEPP device at the receiving end, and does not need to locally maintain message modification policies corresponding to different message transmission paths, so that resources of the SEPP device at the receiving end are saved and costs of the SEPP device at the receiving end are also reduced.

In a possible embodiment, the message modification policy of the IPX device may be a default policy or a wildcard policy. For example, an identifier "1" is used to represent the default policy, and an identifier "0" is used to represent the wildcard policy. In this embodiment, a quantity of policies configured on the SEPP device or the IPX device can be reduced.

Figure 3:
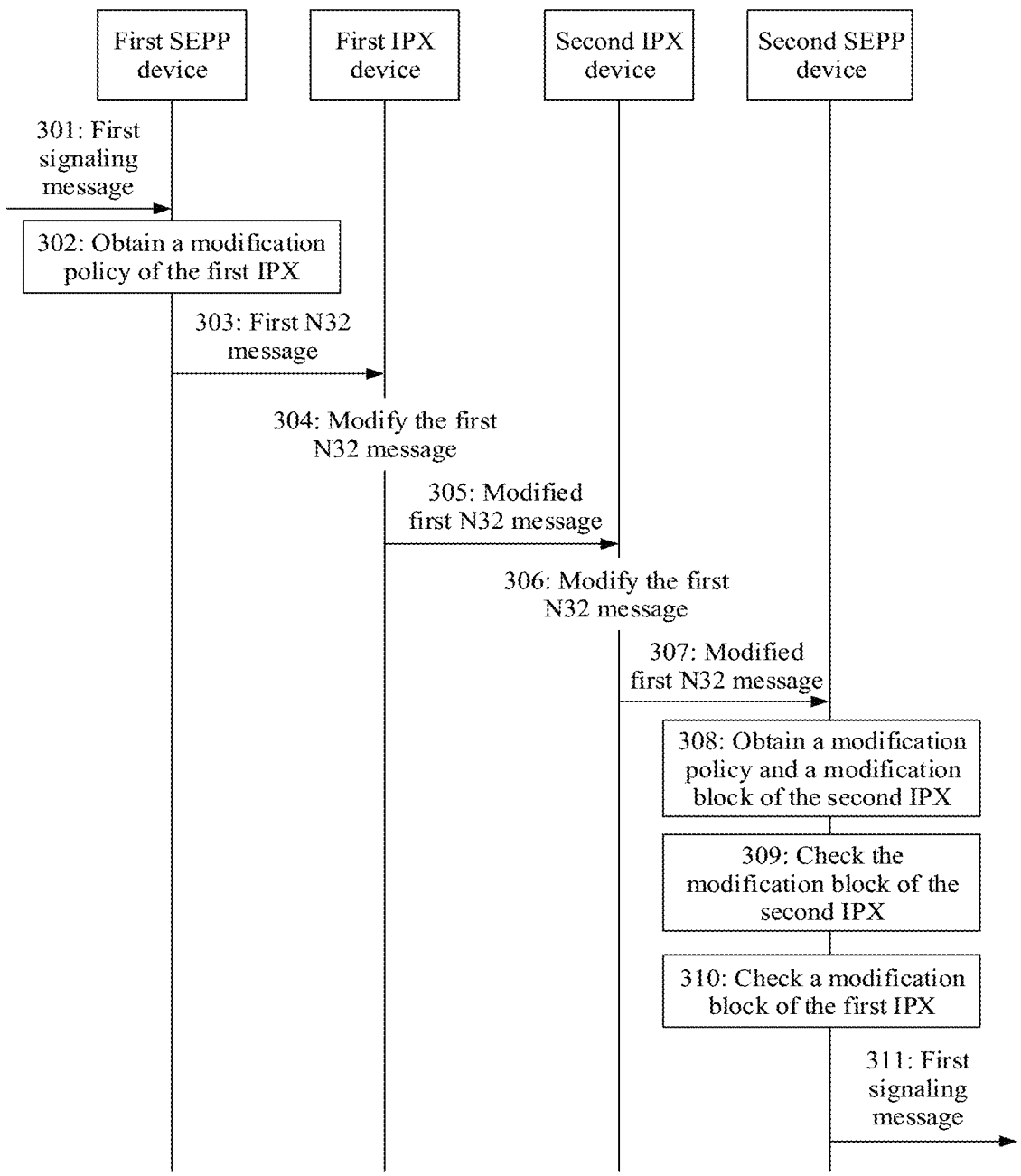
FIG. 3 is a schematic flowchart of another communication method according to an embodiment of this disclosure.

FIG. 3 is a schematic flowchart of another secure communication method according to an embodiment of this disclosure.

The secure communication method provided in this embodiment may be applied to system architectures described in FIG. 1C and FIG. 1E, and there may be a plurality of transmission paths between a first SEPP device and a second SEPP device. A first IPX device is connected to a first SEPP device. A second IPX device is connected to a second SEPP device.

In this embodiment, the SEPP device and the IPX device interconnected with the SEPP device may negotiate a message modification policy, and then the SEPP device and the IPX device locally configure the message modification policy.

The secure communication method provided in this embodiment mainly includes the following operations.

301: The first SEPP device receives a first signaling message sent by an NF device.

302: The first SEPP device obtains a message modification policy of a first IPX device.

303: The first SEPP device sends a first N32 message to the first IPX device, where the first N32 message carries the first signaling message and the message modification policy of the first IPX device.

304: The first IPX device receives the first N32 message sent by the first SEPP device, and modifies the first N32 message for the first time.

An implementation process of the foregoing operations 301 to 304 is similar to that of the operations 201 to 204 in the foregoing embodiment. For details, refer to the descriptions in the foregoing embodiment.

305: The first IPX device sends, to the second IPX device, a first N32 message that has been modified for the first time.

In this embodiment, a message transmission path between the first SEPP device and the second SEPP device includes two IPX devices: the first IPX device and the second IPX device.

306: The second IPX device receives the first N32 message sent by the first IPX device, and modifies the first N32 message for the second time.

In this embodiment, after receiving the first N32 message, the second IPX device may determine that the first N32 message needs to be sent to the second SEPP device. In this case, the second IPX device determines a message modification policy corresponding to the second SEPP device, and then modifies the first N32 message for the second time by using the message modification policy. Modification content may be attached to the first N32 message in a form of a modification block, and is signed by using a private key of the second IPX device.

The second IPX device may determine, based on a local correspondence between an identifier of a SEPP device and a message modification policy, a message modification policy corresponding to an identifier of the second SEPP device.

307: The second IPX device sends, to the second SEPP device, a first N32 message that has been modified for the second time.

In this embodiment, the first N32 message has been modified by the two IPX devices. The first N32 message that has been modified for the second time includes two modification blocks: a modification block of the first IPX device and a modification block of the second IPX device.

308: The second SEPP device obtains a message modification policy of the second IPX device and the modification block of the second IPX device.

In this embodiment, the second SEPP device may locally obtain the message modification policy of the second IPX device.

After receiving the first N32 message sent by the second IPX device, the second SEPP device may perform a security check on the first N32 message. After the security check succeeds, the second SEPP device obtains the modification block of the first IPX device, the modification block of the second IPX device, the first signaling message, and the message modification policy of the first IPX device.

Subsequently, the second SEPP device checks the modification block of the first IPX device and the modification block of the second IPX device. The second SEPP device may check the modification block of the first IPX device first, or may check the modification block of the second IPX device first. In this embodiment, an example in which the modification block of the second IPX device is first checked is used for description.

309: The second SEPP device checks, by using the message modification policy of the second IPX device, the modification block of the second IPX device in the first N32 message that has been modified for the second time.

In this embodiment, the second SEPP device may check whether the modification (that is, the modification block of the second IPX device) performed by the second IPX device on the first N32 message meets the message modification policy of the second IPX device. If the modification meets the message modification policy of the second IPX device, the check succeeds. The second SEPP device further checks the modification block of the first IPX device in the first N32 message, and performs the following operation 310. If the modification does not meet the message modification policy of the second IPX device, the check fails, and the second SEPP device returns a failure response to the second IPX device. The second SEPP device may discard the first N32 message.

310: The second SEPP device checks the modification block of the first IPX device in the first N32 message by using the message modification policy of the first IPX device.

In this embodiment, the second SEPP device may check whether the modification (that is, the modification block of the first IPX device) performed by the first IPX device on the first N32 message meets the message modification policy of the first IPX device. If the modification meets the message modification policy of the first IPX device, the check succeeds, and the second SEPP device performs the following operation. If the modification does not meet the message modification policy of the first IPX device, the check fails, and the second SEPP device returns a failure response. The second SEPP device may discard the first N32 message.

311: The second SEPP device sends the first signaling message to the NF device in the local network after the check succeeds.

The second SEPP device sends the first signaling message to the NF in the local network after the check on the modification block of the first IPX device in the first N32 message succeeds. For example, the second SEPP device sends the first signaling message to an SMF or a UDM in a local core network, and the NF in the local network processes the first signaling message.

In the technical solution provided in this embodiment, the first SEPP device may serve as a SEPP device at a transmitting end to send an N32 message, or may serve as a SEPP device at a receiving end to receive an N32 message. A procedure in which the first SEPP device processes an N32 message sent by the second SEPP device is similar to a procedure in which the second SEPP device processes the first N32 message in the foregoing embodiment. For example, the first SEPP device may check a modification block in a received N32 message. For a specific process, refer to the foregoing related operations. Details are not described herein again.

Correspondingly, the second SEPP device may serve as a SEPP device at a receiving end to receive an N32 message, or may serve as a SEPP device at a transmitting end to send an N32 message. A procedure in which the second SEPP device sends an N32 message is similar to a procedure in which the first SEPP device sends the first N32 message in the foregoing embodiment. For example, the message modification policy of the second IPX device is carried in the N32 message. For a specific process, refer to the foregoing related operations. Details are not described herein again.

In the technical solution provided in this embodiment, the SEPP device at the transmitting end does not need to negotiate message modification policies on an entire transmission path with the SEPP device at the receiving end, but negotiates the message modification policy with the IPX device interconnected with the SEPP device at the transmitting end, and then sends the message modification policy of the IPX device to the SEPP device at the receiving end through the N32 message. This significantly reduces a quantity of message modification policies maintained on the SEPP device, and saves resources of the SEPP device.

In the technical solution provided in this embodiment, the message modification policy is transmitted between the first SEPP device and the second SEPP device through an N32-f message. An existing protection mechanism of the N32-f message is used, so that security of transmission of the message modification policy can be enhanced, and resources are also saved.

Figure 4A:
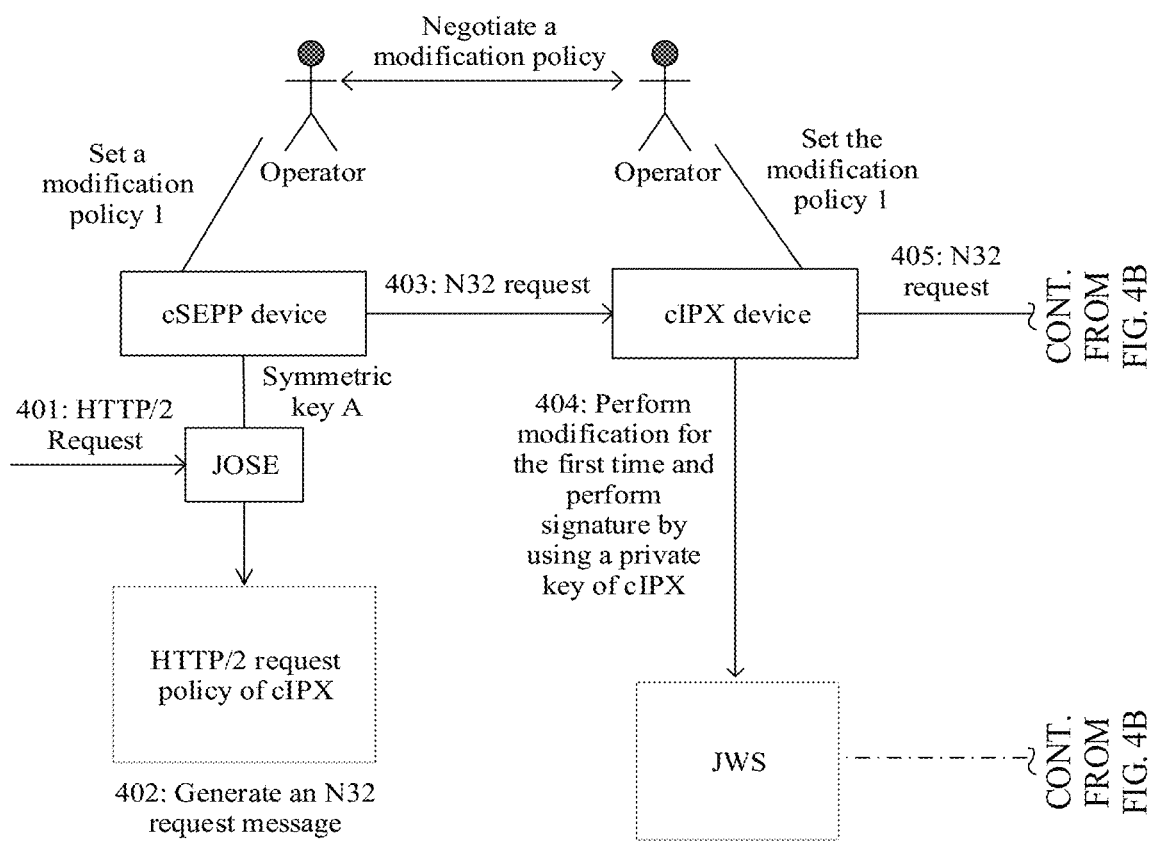
FIG. 4A and FIG. 4B are a schematic flowchart of another communication method according to an embodiment of this disclosure.
Figure 4B:
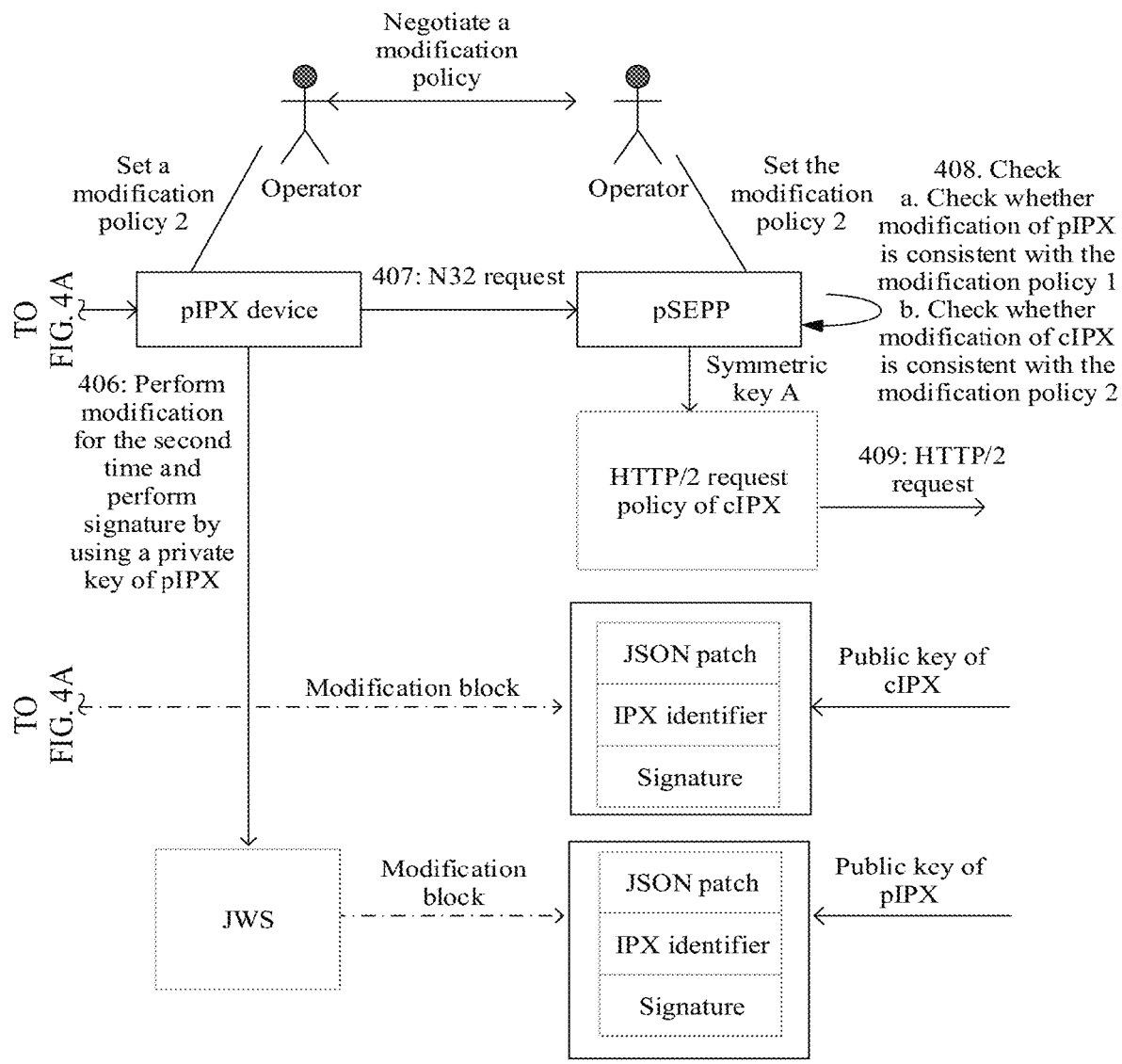

FIG. 4A and FIG. 4B are a schematic flowchart of a secure communication method according to an embodiment of this disclosure.

This embodiment is described by using the system architecture shown in FIG. 1E as an example. A transmission path between a cSEPP device and a pSEPP device includes a cIPX device and a pIPX device. The cSEPP device and the cIPX device interconnected with the cSEPP device may negotiate a message modification policy 1, and then the cSEPP device and the cIPX device locally configure the message modification policy 1. The pSEPP device and the pIPX device interconnected with the pSEPP device may negotiate a message modification policy 2, and then the pSEPP device and the pIPX device locally configure the message modification policy 2. The foregoing negotiation and configuration processes may be executed by an operator, a SEPP device, or an IPX device.

Refer to FIG. 4A and FIG. 4B. The secure communication method in this embodiment may include the following operations.

401: The cSEPP device receives an HTTP/2 request sent by a core network device.

In this embodiment, the core network device in a local network in which the cSEPP device is located sends the HTTP/2 request to the cSEPP device. The HTTP/2 request may carry a specific roaming signaling message, for example, a roaming charging message.

402: The cSEPP device obtains a message modification policy of the cIPX device and generates an N32 request message.

In this embodiment, the cSEPP device may determine that the HTTP/2 request message needs to be sent to the pSEPP device via the cIPX device. In this case, the cSEPP device obtains the message modification policy of the cIPX device locally. The cSEPP device may determine, based on information such as a user identifier or a carrier identifier in the HTTP/2 message, that the HTTP/2 request message needs to be sent to the pSEPP device via the cIPX device.

In an optional embodiment, the message modification policy may further include a field that is in a message header and that can be modified and/or a field that is in the message header and that cannot be modified. For example, a header value field in a message header of an N32 request message can be modified, an encBlockIndex field in the message header cannot be modified, and a payload field in the message header can be modified.

In an optional embodiment, the N32 request message further carries a public key or a security certificate of the cIPX device. The cSEPP device may place the public key or the security certificate of the cIPX device in a message body or the message header of the N32 request message and send N32 request message to the cIPX device.

403: The cSEPP device sends the N32 request message to the cIPX device.

In this embodiment, the message header of the N32 request message may carry an identifier of the pSEPP device, for example, a host name of the pSEPP device. In addition, the N32 request message may further carry an identifier of the cSEPP device, for example, a host name of the cSEPP device.

404: The cIPX device modifies the received N32 request message and performs signature authentication.

In this embodiment, the cIPX device receives the N32 request message sent by the cSEPP device, then locally obtains a message modification policy corresponding to the cSEPP device, and modifies the N32 request message for the first time according to the message modification policy. Modification content of the cIPX device is attached to the N32 message in a form of a modification block.

The cIPX device may modify the message header of the N32 request message, for example, modify the header value field in the message header of the N32 request message.

Having modified the N32 request message, the cIPX device may perform asymmetric signature on the modification block by using a private key. Signed content carries a JAVASCRIPT object notation (JSON) web page signature (JWS). The finally generated modification block includes an identifier (cIPX ID) of the cIPX device, a signature of the cIPX device, and a JSON patch. The JSON patch includes the modification content of the cIPX device.

405: The cIPX device sends a modified N32 request message to the pIPX device.

In this embodiment, having completed the signature on the modification content, the cIPX device places the modification block in a message body of the N32 request message and sends the modification block to the pIPX device.

406: The pIPX device modifies the received N32 request message and performs signature authentication.

In this embodiment, the pIPX device receives the N32 request message sent by the cIPX device, and then learns that the N32 request message needs to be sent to the pSEPP device. In this case, the pIPX device obtains a message modification policy corresponding to the pSEPP device, and modifies the N32 request message for the second time according to the message modification policy. Modification content of the pIPX device is also attached to the message body of the N32 message in a form of a modification block.

The pIPX device may modify the message header of the N32 request message, for example, modify the payload field in the message header of the N32 request message. The pIPX device may learn, based on the identifier of the pSEPP device carried in the message header of the N32 message, that the N32 message needs to be sent to the pSEPP device.

Having modified the N32 request message, the pIPX device may perform asymmetric signature on the modification block by using a private key. Signed content carries a JSON web page signature. The finally generated modification block includes an identifier (pIPX ID) of the pIPX device, a signature of the pIPX device, and a JSON patch. The JSON patch includes the modification content of the pIPX device.

407: The pIPX device sends, to the pSEPP device, a modified N32 request message.

In this embodiment, having completed the signature on the modification content, the pIPX device places the modification block in a message body of the N32 request message and sends the modification block to the pSEPP device. In this case, the N32 request message includes the HTTP/2 request message, the modification block of the cIPX device, and the modification block of the pIPX device.

408: The pSEPP device checks the N32 request message.

In this embodiment, after receiving the modified N32 request message sent by the pIPX device, the pSEPP device may verify the modification block of the cIPX device and the modification block of the pIPX device. For a specific verification process, refer to FIG. 4C.

Figure 4C:
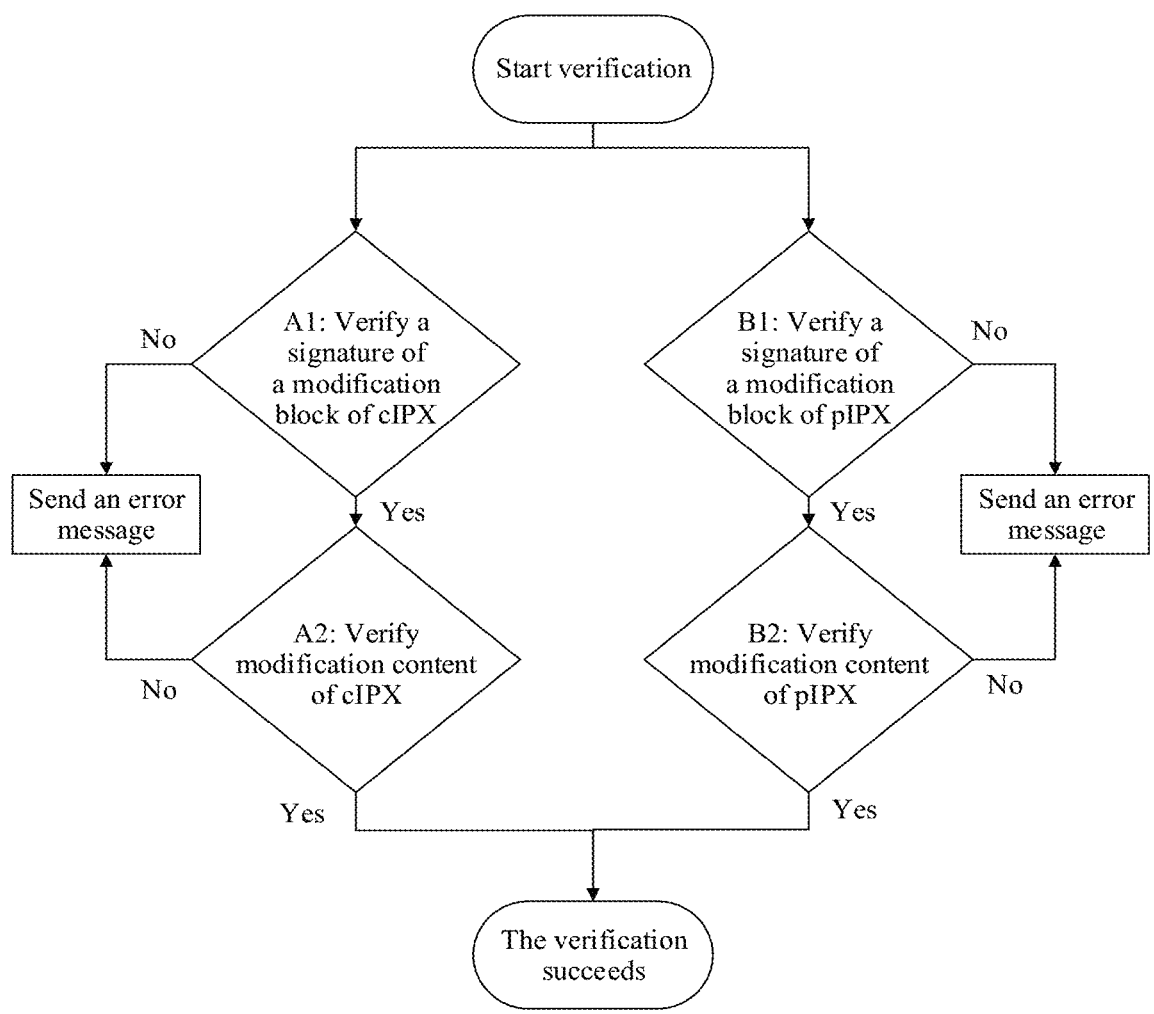
FIG. 4C is a schematic flowchart of checking a modification block of an IPX device according to a communication method provided in an embodiment of this disclosure.

The verification process in FIG. 4C includes the following operations.

A1: The pSEPP device verifies the signature in the modification block of the cIPX device.

In this embodiment, the pSEPP device may obtain the public key of the cIPX device from the message body of the N32 message. In addition, the pSEPP device may alternatively locally obtain the public key of the cIPX device based on the identifier of the cIPX device in the modification block.

The pSEPP device then uses the public key to unsigncrypt the modification block of the cIPX device, to be specific, to verify whether the modification block is generated by the cIPX device. If the modification block is generated by the cIPX device, operation A2 is performed, to be specific, the pSEPP device further verifies whether the modification content in the modification block of the cIPX device meets the message modification policy of the cIPX device. If the modification block is not generated by the cIPX device, the verification fails, and the pSEPP device sends an error message to the cSEPP device. The pSEPP device may discard the received N32 request message.

A2: The pSEPP device verifies whether the modification content of the cIPX device meets the message modification policy of the cIPX device.

In this embodiment, the pSEPP device may obtain the message modification policy of the cIPX device, namely, the foregoing message modification policy 1, from the message body or the message header of the N32 message. Subsequently, the pSEPP device verifies (or checks) the modification content of the cIPX device according to the obtained message modification policy of the cIPX device. For example, the pSEPP device checks whether the field that cannot be modified in the message modification policy is modified by the cIPX device. If the field is not modified, the verification succeeds. If the field is modified, the verification fails, and the pSEPP device sends an error message to the cSEPP device. The pSEPP device may discard the received N32 request message.

B1: The pSEPP device verifies the signature in the modification block of the pIPX device.

In this embodiment, the pSEPP device may locally obtain a public key of the pIPX device based on the identifier of the pIPX device in the modification block.

The pSEPP device then uses the public key to unsigncrypt the modification block of the pIPX device, to be specific, to verify whether the modification block is generated by the pIPX device. If the modification block is generated by the pIPX device, operation B2 is performed, to be specific, the pSEPP device further verifies whether modification content in the modification block of the pIPX device meets the message modification policy of the pIPX device. If the modification block is not generated by the pIPX device, the verification fails, and the pSEPP device sends an error message to the cSEPP device. The pSEPP device may discard the received N32 request message.

B2: The pSEPP device verifies whether the modification content of the pIPX device meets the message modification policy of the pIPX device.

In this embodiment, the pSEPP device may locally obtain, based on the identifier of the pIPX device, the message modification policy of the pIPX device, namely, the foregoing message modification policy 2. Subsequently, the pSEPP device verifies (or checks) the modification content in the modification block of the pIPX device according to the obtained message modification policy of the pIPX device. For example, the pSEPP device verifies whether a field that cannot be modified in the message modification policy is modified by the pIPX device. If the field that cannot be modified is not modified, the verification succeeds. If the field that cannot be modified is modified, the verification fails, and the pSEPP device sends an error message to the cSEPP device. The pSEPP device may discard the received N32 request message.

After both the verification in A2 and the verification in B2 succeed, the pSEPP device may send the HTTP/2 request message in the N32 message to another device in the local network, that is, perform operation 409.

The foregoing operations A1-A2 and B1-B2 may be performed serially by the pSEPP device, or the foregoing operations A1-A2 and B1-B2 may be performed concurrently by the pSEPP device. However, if any determining result is no, the pSEPP device sends the error message to the cSEPP device. The pSEPP device may discard the received N32 request message.

409: The pSEPP device sends the HTTP/2 request message to the device in the local network.

In this embodiment, after receiving the N32 request message, the pSEPP device may decrypt the message body of the N32 message by using a symmetric key A, to obtain the HTTP/2 message. The pSEPP device may send the obtained HTTP/2 request message to the core network device in the local network after successfully verifying the modification block of the cIPX device and the modification block of the pIPX device.

In the technical solution provided in this embodiment, the cSEPP device does not need to negotiate message modification policies on an entire transmission path with the pSEPP device, but negotiates the message modification policy with the cIPX device interconnected with the cSEPP device, and then sends the message modification policy of the cIPX device to the pSEPP device through the N32 message. This reduces a quantity of message modification policies maintained on the cSEPP device, and saves resources of the cSEPP device.

Correspondingly, the pSEPP device may directly obtain, from the received N32 message, the message modification policy of the cIPX device interconnected with the cSEPP device, and does not need to locally maintain message modification policies corresponding to different message transmission paths, so that resources of the cSEPP device are saved and costs of the cSEPP device are also reduced.

Figure 4D:
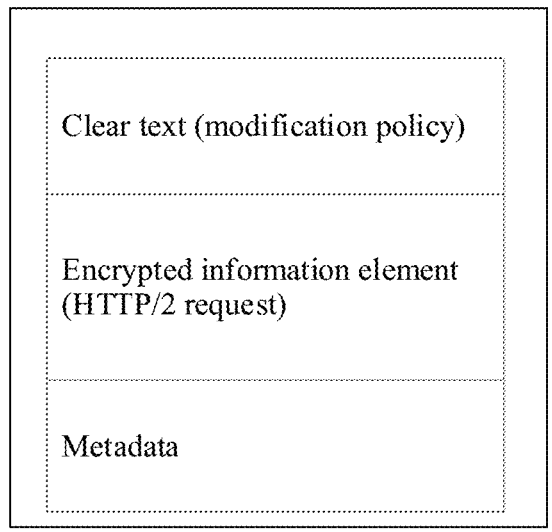
FIG. 4D is a schematic diagram of a message body of an N32 message according to a communication method provided in an embodiment of this disclosure.

In this embodiment, the cSEPP device may perform format conversion on the received HTTP/2 request message to generate the N32 message. For example, the cSEPP device may encapsulate the HTTP/2 message into the message body of the N32 message. An encapsulation process may include the cSEPP device that encrypts the HTTP/2 message by using the symmetric key A and a JAVASCRIPT object signature and encryption (JOSE) algorithm, to obtain an encrypted information element (IE). Subsequently, the cSEPP device may encapsulate the encrypted information element, a clear text part, and metadata into the message body of the N32 message. In this case, for a structure of the message body of the N32 message, refer to FIG. 4D. The message body of the N32 message may also be referred to as a verification block. The clear text part in the message body may carry the message modification policy of the cIPX device. The encrypted information element carries the HTTP/2 request message. A metadata part may carry an identifier of a next hop (for example, the ID of the cIPX device). The cSEPP device may perform integrity protection on the clear text part in the message body.

Figure 4E:
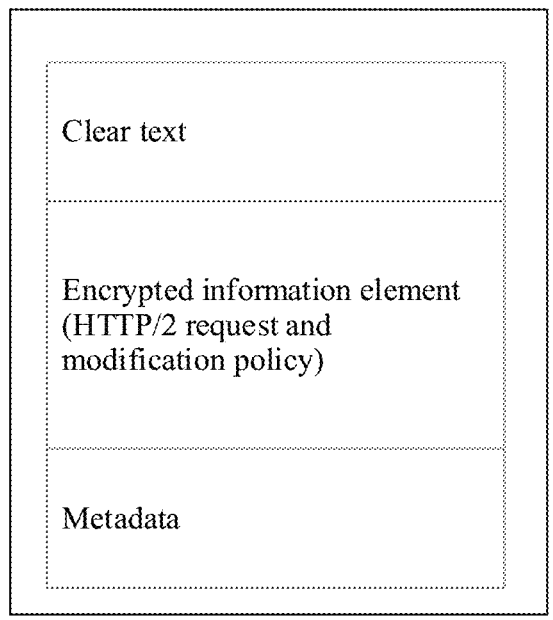
FIG. 4E is a schematic diagram of a message body of another N32 message according to a communication method provided in an embodiment of this disclosure.

In another optional embodiment, the cSEPP device may alternatively encrypt the HTTP/2 message and the message modification policy of the cIPX device by using the symmetric key A and the JOSE algorithm, to obtain an encrypted information element IE. In this case, the encrypted information element includes the HTTP/2 request message and the message modification policy of the cIPX device. Subsequently, the cSEPP device may encapsulate the encrypted information element, a clear text part, and the metadata into the message body of the N32 message (as shown in FIG. 4E). In this case, the clear text part carries the identifier of the cIPX, but does not carry the message modification policy of the cIPX device.

Figure 4F:
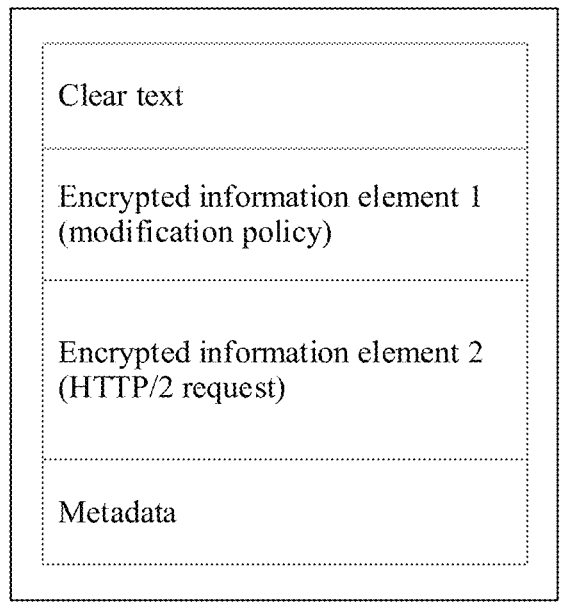
FIG. 4F is a schematic diagram of a message body of another N32 message according to a communication method provided in an embodiment of this disclosure.

In another optional embodiment, the cSEPP device may alternatively encrypt the HTTP/2 message and the message modification policy of the cIPX device separately by using the symmetric key A and the JOSE algorithm, to obtain two encrypted information elements. In this case, the two encrypted information elements separately include the HTTP/2 request message and the message modification policy of the cIPX device. Subsequently, the cSEPP device may encapsulate two encrypted information elements, a clear text part, and the metadata into the message body of the N32 message (as shown in FIG. 4F). In this case, the clear text part carries the identifier of the cIPX, but does not carry the message modification policy of the cIPX device.

The following describes some apparatus embodiments.

Figure 5:
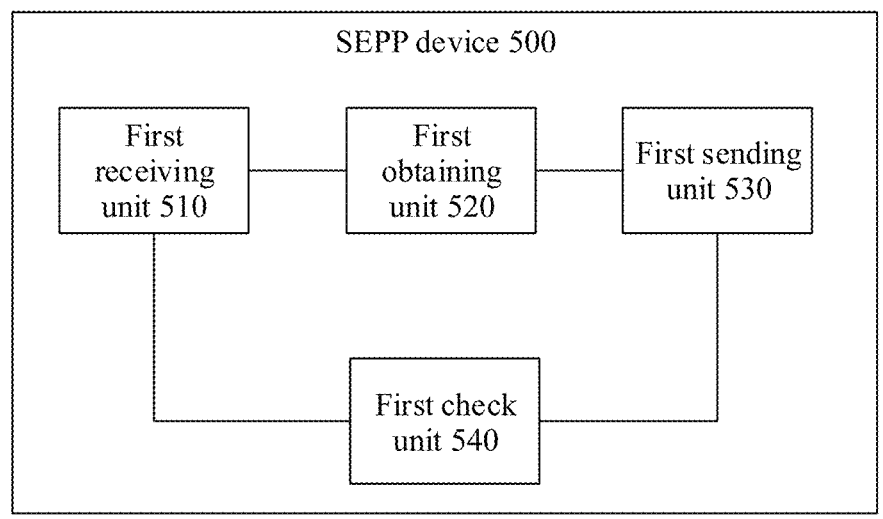
FIG. 5 is a schematic diagram of a function of a SEPP device according to an embodiment of this disclosure.

FIG. 5 is a schematic diagram of a function of a SEPP device according to an embodiment of this disclosure.

As shown in the figure, the SEPP device 500 mainly includes a first receiving unit 510, a first obtaining unit 520, and a first sending unit 530.

The first receiving unit 510 is configured to receive a first signaling message sent by an NF device.

The first obtaining unit 520 is configured to obtain a message modification policy of an IP exchange service IPX device.

The first sending unit 530 is configured to send a first N32 message to the IPX device, where the first N32 message carries the first signaling message and the message modification policy of the IPX device.

The SEPP device provided in this embodiment may be used in the secure communication method provided in the foregoing method embodiments. For specific details and beneficial effects, refer to the foregoing embodiments.

Through cooperation among the first receiving unit 510, the first obtaining unit 520, and the first sending unit 530, the SEPP device provided in this embodiment can implement secure transmission of the message modification policy of the IPX device between a SEPP device at a transmitting end and a SEPP device at a receiving end, so that security of communication between the SEPP device at the transmitting end and the SEPP device at the receiving end is improved.

In a possible embodiment, the first obtaining unit 520 in the SEPP device may be further configured to obtain a security certificate of the IPX device. In this case, the first N32 message sent by the first sending unit 530 carries the security certificate of the IPX device.

In a possible embodiment, the first sending unit 530 of the SEPP device may send the first N32 message in the following manner. The first sending unit 530 encapsulates the first signaling message and the message modification policy of the IPX device in a message body of the first N32 message, and sends the first signaling message and the message modification policy of the IPX device to the IPX device.

In a possible embodiment, the message modification policy of the IPX device may be carried in a clear text part of a message body of the first N32 message.

In a possible embodiment, the first obtaining unit 520 may obtain the message modification policy of the IPX device from a local configuration.

In a possible embodiment, the first receiving unit 510 of the SEPP device is further configured to receive a second N32 message sent by the IPX device, where the second N32 message carries a second signaling message and modification content of the IPX device.

Still refer to FIG. 5. The SEPP device provided in this embodiment may further include a first check unit 540 configured to check the modification content of the IPX device in the second N32 message according to the message modification policy of the IPX device. Further, the first sending unit 530 sends the second signaling message to the NF device after the check performed by the first check unit 540 succeeds.

Figure 6:
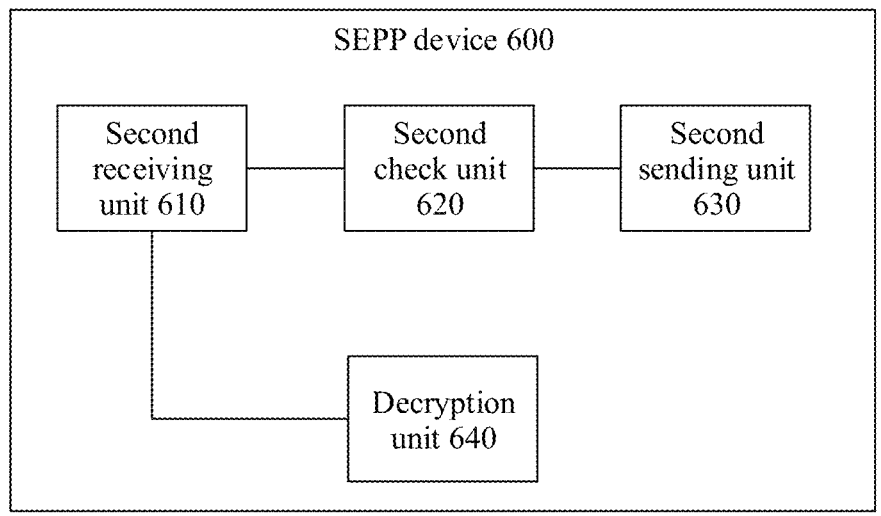
FIG. 6 is a schematic diagram of a function of another SEPP device according to an embodiment of this disclosure.

FIG. 6 is a schematic diagram of a function of a SEPP device according to an embodiment of this disclosure.

As shown in the figure, the SEPP device 600 mainly includes a second receiving unit 610, a second check unit 620, and a second sending unit 630.

The second receiving unit 610 is configured to receive an N32 message, where the N32 message carries a signaling message and a message modification policy of an IPX device. The second check unit 620 is configured to check the N32 message according to the message modification policy of the IPX device. The second sending unit 630 is configured to send the signaling message to an NF device after the check performed on the N32 message by the second check unit 620 succeeds.

The SEPP device provided in this embodiment may be used in the secure communication method provided in the foregoing method embodiments. For specific details and beneficial effects, refer to the foregoing embodiments.

Through cooperation among the second receiving unit 610, the second check unit 620, and the second sending unit 630, the SEPP device provided in this embodiment can implement secure transmission of the message modification policy of the IPX device between a SEPP device at a transmitting end and a SEPP device at a receiving end, so that security of communication between the SEPP device at the transmitting end and the SEPP device at the receiving end is improved.

In a possible embodiment, the N32 message received by the second receiving unit 610 in the SEPP device further carries a security certificate of the IPX device. That the second check unit 620 checks the N32 message according to the message modification policy includes the second check unit 620 that checks a signature in a modification block of the IPX device in the N32 message based on the security certificate of the IPX device. After the check succeeds, the second check unit 620 further checks modification content in the modification block of the IPX device according to the message modification policy.

Still refer to FIG. 6. The SEPP device provided in this embodiment may further include a decryption unit 640 configured to decrypt a message body of the N32 message, to obtain the message modification policy of the IPX device.

In a possible embodiment, the decryption unit 640 of the SEPP device is further configured to decrypt the message body of the N32 message, to obtain the signaling message carried in the N32 message.

Figure 7:
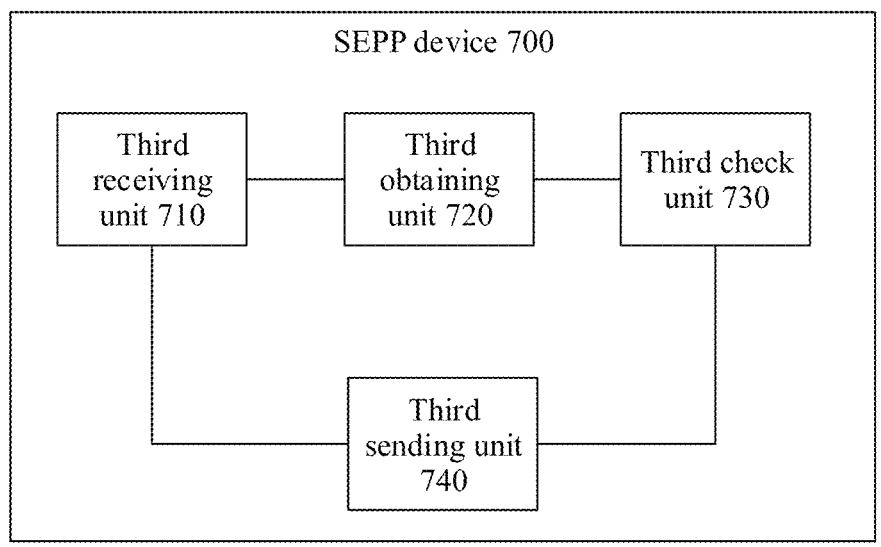
FIG. 7 is a schematic diagram of a function of another SEPP device according to an embodiment of this disclosure.

FIG. 7 is a schematic diagram of a function of a SEPP device according to an embodiment of this disclosure.

As shown in the figure, the SEPP device 700 mainly includes a third receiving unit 710, a third obtaining unit 720, a third check unit 730, and a third sending unit 740.

The third receiving unit 710 is configured to receive an N32 message sent by a first IPX device, where the N32 message carries a signaling message.

The third obtaining unit 720 is configured to obtain a message modification policy of the first IPX device.

The third check unit 730 is configured to check the N32 message according to the message modification policy.

The third sending unit 740 is configured to send the signaling message to the NF device after the check on the N32 message performed by the third check unit 730 succeeds.

The SEPP device provided in this embodiment may be used in the secure communication method provided in the foregoing method embodiments. For specific details and beneficial effects, refer to the foregoing embodiments.

Through cooperation among the third receiving unit 710, the third obtaining unit 720, the third check unit 730, and the third sending unit 740, the SEPP device provided in this embodiment can implement secure transmission of the message modification policy of the IPX device between a SEPP device at a transmitting end and a SEPP device at a receiving end, so that security of communication between the SEPP device at the transmitting end and the SEPP device at the receiving end is improved.

In a possible embodiment, the N32 message received by the third receiving unit 710 further carries modification content of the first IPX device. The third check unit 730 may check the N32 message in the following manner. The third check unit 730 checks the modification content of the first IPX device in the N32 message according to the message modification policy.

In a possible embodiment, the N32 message received by the third receiving unit 710 further carries a security certificate of a second IPX device, a message modification policy of the second IPX device and a modification block of the second IPX device. In this case, the third check unit 730 is further configured to check the modification block of the second IPX device by using the security certificate. When the check succeeds, the third check unit checks modification content in the modification block of the second IPX device according to the message modification policy of the second IPX device.

In a possible embodiment, the third receiving unit 710 of the first SEPP device is further configured to receive a notification message sent by the second SEPP device, where the notification message carries the message modification policy of the second IPX device.

In a possible embodiment, the first SEPP device is a cSEPP device, and the second SEPP device is a pSEPP device. In a possible embodiment, the first SEPP device is a vSEPP device, and the second SEPP device is an hSEPP device.

Figure 8:
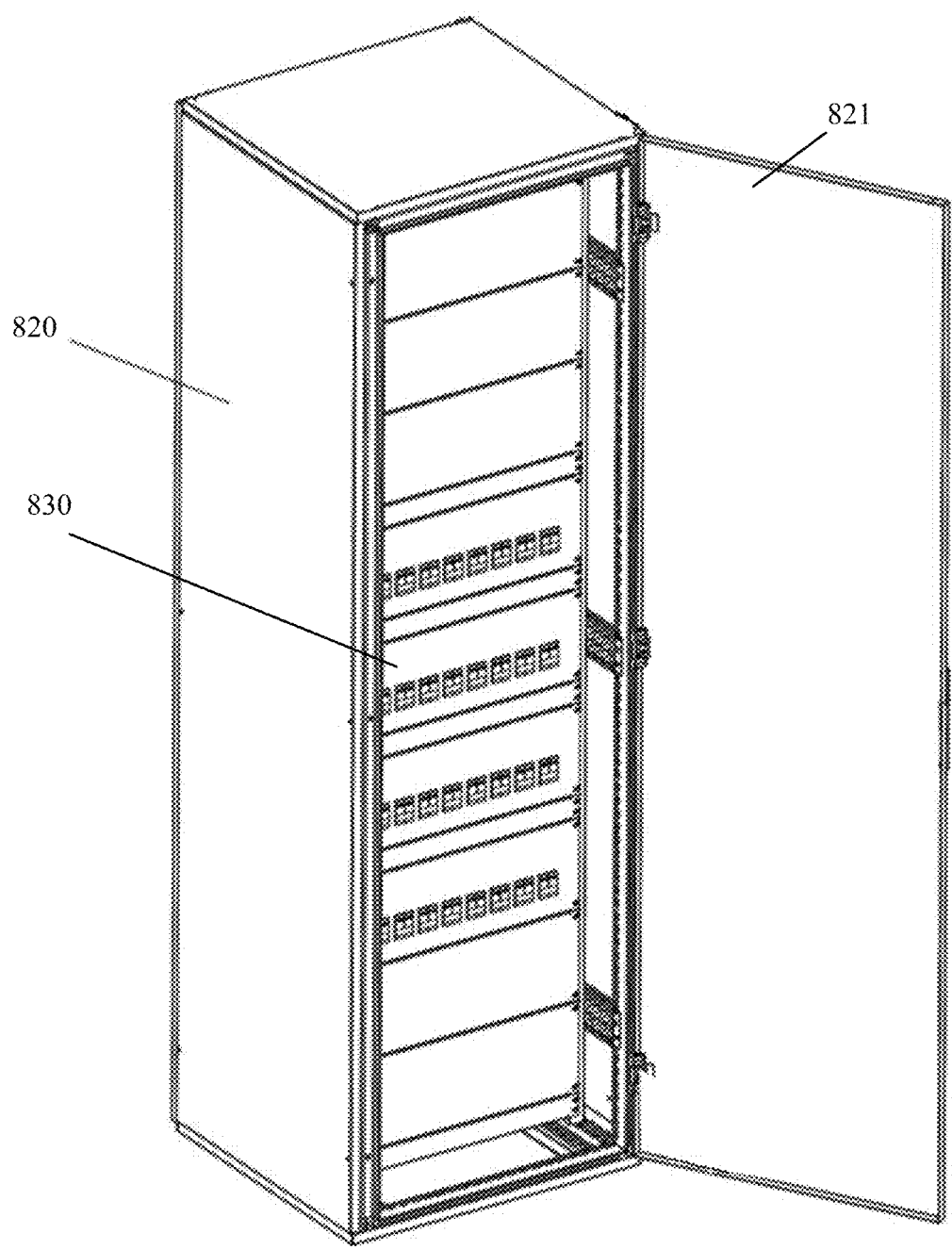
FIG. 8 is a schematic diagram of a structure of a communication apparatus according to an embodiment of this disclosure.
Figure 9:
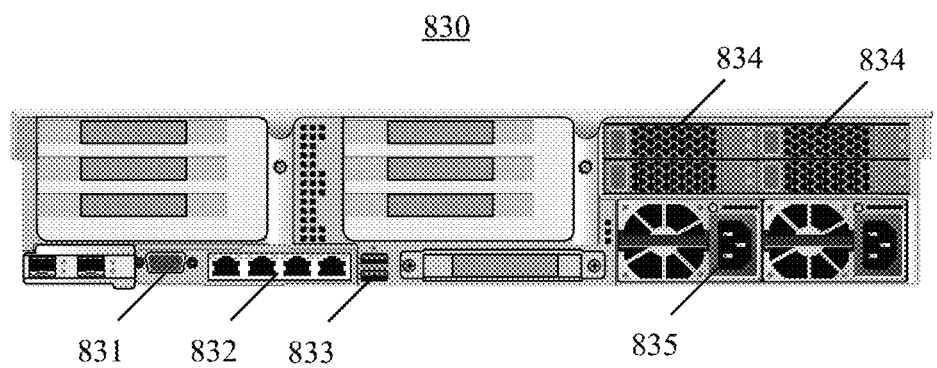
FIG. 9 is a schematic diagram of interfaces of a board in a communication apparatus according to an embodiment of this disclosure.

FIG. 8 is a schematic diagram of a structure of a communication apparatus according to an embodiment of this disclosure, and FIG. 9 is a schematic diagram of interfaces of a board 830 in the communication apparatus.

As shown in the figure, the communication apparatus mainly includes a cabinet 820 and a board 830 installed in the cabinet. The board includes chips and electronic components, and may provide a communication service. A quantity of the board 830 may be increased or decreased based on an actual requirement, and the quantity of the board 830 is not limited in this embodiment. In addition, a cabinet door 821 is further installed in the cabinet 820.

As shown in FIG. 9, the board 830 includes a plurality of input/output interfaces, for example, a display interface 831 configured to connect to an external display, a network interface 832 connected to a communication network, and a Universal Serial Bus (USB) interface 833.

In addition, the board 830 further includes a power interface 835 connected to a power supply, a heat dissipation port 834 configured to dissipate heat, and the like.

The communication apparatus implements different functions by installing different boards 830. For example, the communication apparatus may implement functions of the SEPP device in embodiments of this disclosure. A control element such as a general purpose processor, a control chip, or a logic circuit is installed on the board 830. A memory such as a storage chip may also be installed in the board 830. The processor and the memory may cooperate with a related communication interface to perform some or all operations of any method that can be performed by the SEPP device in embodiments of this disclosure.

Figure 10:
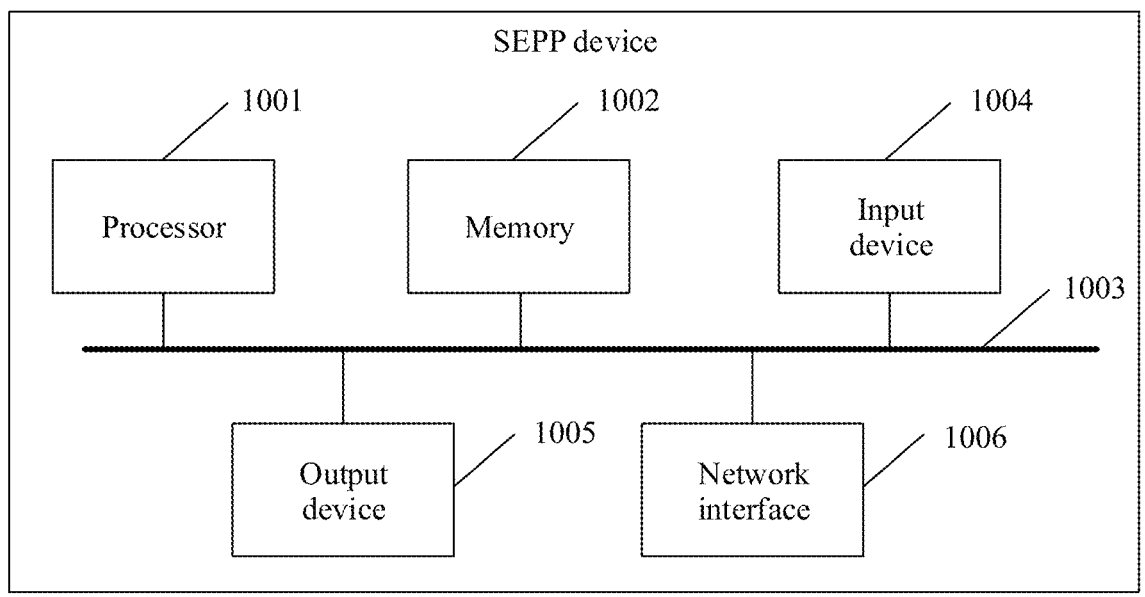
FIG. 10 is a diagram of a structure of hardware of a SEPP device according to an embodiment of this disclosure.

FIG. 10 is a diagram of a structure of hardware of a SEPP device according to an embodiment of the present disclosure.

The SEPP device provided in this embodiment may use general-purpose computer hardware, including a processor 1001, a memory 1002, a bus 1003, an input device 1004, an output device 1005, and a network interface 1006.

Further, the memory 1002 may include a computer storage medium in a form of a volatile and/or nonvolatile memory, for example, a read-only memory (ROM) and/or a random-access memory (RAM). The memory 1002 can store an operating system, an application program, another program module, executable code, and program data.

The input device 1004 may be configured to input commands and information to the SEPP device. The input device 1004 may be, for example, a keyboard or a pointer device such as a mouse, a trackball, a touchpad, a microphone, a joystick, a game pad, a satellite television antenna, a scanner, or a similar device. These input devices may be connected to the processor 1001 via the bus 1003.

The output device 1005 may be configured to output information by the SEPP device. In addition to a monitor, the output device 1005 may be another peripheral output device, for example, a loudspeaker and/or a printing device. These output devices may also be connected to the processor 1001 via the bus 1003.

The SEPP device may be connected to a communication network, for example, connected to a local area network (LAN), through the network interface 1006. In a network connection environment, computer-executable instructions stored in the SEPP device may be stored in a remote storage device, and are not limited to being stored locally.

When the processor 1001 in the SEPP device executes the executable code or the application program stored in the memory 1002, the SEPP device may perform method operations on a SEPP device side in the foregoing method embodiments, for example, perform operations 201, 202, 301, 307, and 401 to 403. For a specific execution process, refer to the foregoing method embodiments. Details are not described herein again.

An embodiment of this disclosure further provides a computer-readable storage medium. The computer-readable storage medium stores a computer program. When the computer program is executed by hardware (such as a processor), some or all operations of any method that can be performed by a SEPP device in embodiments of this disclosure can be implemented.

An embodiment of this disclosure further provides a computer program product including instructions. When the computer program product is run on a computer device, the computer device is enabled to perform some or all operations of any method that may be performed by a SEPP device.

A part or all of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, all or a part of the procedures or functions according to embodiments of this disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, the description of each embodiment has respective focuses. For a part that is not described in detail in an embodiment, refer to related descriptions in other embodiments.

In the foregoing embodiments, the description of each embodiment has respective focuses. For a part that is not described in detail in an embodiment, refer to related descriptions in other embodiments.

In the several embodiments provided in this disclosure, it should be understood that the disclosed apparatuses may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or the part contributing to the conventional technologies, or all or some of the technical solutions may be implemented in a form of a software product. The computer software product is stored in a storage medium and includes several instructions for instructing a computer device (which may be a personal computer, a server, a network device, or the like) to perform all or some of the operations of the methods in embodiments of this disclosure.

What is claimed is:

1. A method implemented by a second security and edge protection proxy (SEPP) device, wherein the method comprises:
    receiving, from a second Internet Protocol (IP) exchange service (IPX) device, an N32 message carrying a first signaling message, a first modification block of a first IPX device, and a second modification block of the second IPX device;
    receiving, from a first SEPP device, a notification message carrying a first message modification policy of the first IPX device;
    obtaining, from the notification message, the first message modification policy;
    checking, according to the first message modification policy, the first modification block;
    obtaining a second message modification policy of the second IPX device;
    sending, to the first SEPP device, a notification message carrying the second message modification policy;
    checking, according to the second message modification policy, the second modification block; and
    sending, to a network function (NF) device after checking the first modification block and checking the second modification block is succeeded, the first signaling message.

2. The method of claim 1, further comprising further obtaining the second message modification policy in a local manner.

3. The method of claim 1, wherein the N32 message further carries a security certificate of the first IPX device, and wherein before checking the first modification block, the method further comprises:
    checking, using the security certificate, modification content of the first IPX device; and
    further checking the first modification block after checking the modification content is suceeeded.

4. The method of claim 1, further comprising:
    receiving, from the NF device, a second signaling message; and
    sending, to the second IPX device, the second signaling message.

5. The method of claim 1, further comprising returning a failure response after checking the first modification block or checking the second modification block has failed.

6. A method comprising:
    receiving, by a second security and edge protection proxy (SEPP) device, an N32 message from a second Internet Protocol (IP) exchange service (IPX) device, wherein the N32 message carries a first signaling message, a first modification block of a first IPX device, and a second modification block of the second IPX device;
    obtaining, by a first SEPP device, the first message modification policy;
    sending, by the first SEPP device, the first message modification policy to the second SEPP;
    obtaining, by the second SEPP device, the first message modification policy;
    checking, by the second SEPP device according to the first message modification policy, the first modification block;
    obtaining, by the second SEPP device, a second message modification policy of the second IPX device;
    obtaining, by the first SEPP, the second message modification policy from the second SEPP;
    checking, by the second SEPP device according to the second message modification policy, the second modification block;
    sending, by the second SEPP device to a network function (NF) device after checking the first modification block and checking the second modification block is succeeded, the first signaling message; and
    receiving, by the NF device, the first signaling message.

7. The method of claim 6, further comprising:
    sending, by the NF device, a second signaling message to the second SEPP device;
    receiving, by the second SEPP device, the second signaling message; and
    sending, by the second SEPP device, the second signaling message to the second IPX device.

8. The method of claim 6, further comprising sending, by the second IPX device, the N32 message to the second SEPP device.

9. A second security and edge protection proxy (SEPP) device comprising:
    a memory configured to store instructions; and
    a processor coupled to the memory and configured to execute the instructions to cause the second SEPP device to:
        receive, from a second Internet Protocol (IP) exchange service (IPX) device, an N32 message carrying a first signaling message, a first modification block of a first IPX device, and a second modification block of the second IPX device;
        receive, from a first SEPP device, a notification message carrying a first message modification policy of the first IPX device;
        obtain, from the notification message, the first message modification policy;
        check, according to the first message modification policy, the first modification block;
        obtain a second message modification policy of the second IPX device;
        send, to the first SEPP device, a notification message carrying the second message modification policy;
        check, according to the second message modification policy, the second modification block; and
        send, to a network function (NF) device after checking the first modification block and checking the second modification block is succeeded, the first signaling message.

10. The second SEPP device of claim 9, wherein the processor is further configured to execute the instructions to cause the second SEPP device to further obtain the second message modification policy in a local manner.

11. The second SEPP device of claim 9, wherein the N32 message further carries a security certificate of the first IPX device, and wherein the processor is further configured to execute the instructions to cause the second SEPP device to:
  check, using the security certificate, modification content of the first IPX device before checking the first modification block; and
  further check the first modification block according to the first message modification policy after checking the modification content is succeeded.

12. The second SEPP device of claim 9, wherein the processor is further configured to execute the instructions to cause the second SEPP device to:
  receive, from the NF device, a second signaling message; and
  send, to the second IPX device, the second signaling message.

13. The second SEPP device of claim 9, wherein the processor is further configured to execute the instructions to cause the second SEPP device to return a failure response after checking the first modification block or checking the second modification block has failed.

14. A system comprising:
  a second security and edge protection proxy (SEPP) device configured to:
    receive, from a second Internet Protocol (IP) exchange service (IPX) device, an N32 message carrying a first signaling message, a first modification block of a first IPX device, and a second modification block of the second IPX device;
    obtain a first message modification policy of the first IPX device;
    check, according to the first message modification policy, the first modification block;
    obtain a second message modification policy of the second IPX device;
    check, according to the second message modification policy, the second modification block; and
    send the first signaling message after checking the first modification block and checking the second modification block is succeeded;
  a first SEPP device configured to:
    couple to the first IPX device;
    couple to the second IPX device;
    obtain the first message modification policy;
    send the first message modification policy to the second SEPP; and
    obtain the second message modification policy from the second SEPP; and
  a network function (NF) device coupled to the second SEPP device and configured to receive the first signaling message from the second SEPP device.

15. The system of claim 14, wherein the NF device is further configured to send a second signaling message to the second SEPP device, wherein the second SEPP device is further configured to:
  receive the second signaling message; and
  send the second signaling message to the second IPX device.

* * * * *